(12) United States Patent
Evens et al.

(10) Patent No.: US 11,207,877 B2
(45) Date of Patent: Dec. 28, 2021

(54) STRUCTURAL REWORK OF CELLULAR CORE PANELS

(71) Applicant: The Boeing Company, Chicago, IL (US)

(72) Inventors: Michael W. Evens, Burien, WA (US); Genesis Pilarca, Shoreline, WA (US); Nihar A. Desai, Bothell, WA (US); David M. Walter, Renton, WA (US); Ebonni J. Adams, Edmonds, WA (US); Nicole Titus, Edmonds, WA (US); Shekar Vimala, Bothell, WA (US); Timothy S. Barrett, Melbourne, FL (US); John Spalding, Seattle, WA (US); Dan Perron, Federal Way, WA (US)

(73) Assignee: The Boeing Company, Chicago, IL (US)

( * ) Notice: Subject to any disclaimer, the term of this patent is extended or adjusted under 35 U.S.C. 154(b) by 80 days.

(21) Appl. No.: 16/779,922

(22) Filed: Feb. 3, 2020

(65) Prior Publication Data
US 2020/0223208 A1     Jul. 16, 2020

Related U.S. Application Data

(62) Division of application No. 15/825,335, filed on Nov. 29, 2017, now Pat. No. 10,589,505.

(51) Int. Cl.
*B26D 1/06* (2006.01)
*B32B 43/00* (2006.01)
(Continued)

(52) U.S. Cl.
CPC .............. *B32B 43/003* (2013.01); *B26B 3/04* (2013.01); *B26B 29/06* (2013.01); *B26D 7/0006* (2013.01);
(Continued)

(58) Field of Classification Search
CPC ....... B32B 43/003; B32B 37/12; B32B 3/266; B32B 37/146; B32B 38/0036;
(Continued)

(56) References Cited

U.S. PATENT DOCUMENTS

| 870,971 A | 11/1907 | Lindstrom |
| 5,404,778 A | 4/1995 | Ward |

(Continued)

FOREIGN PATENT DOCUMENTS

| CN | 105965086 A | 9/2016 |
| JP | H091263 A | 1/1997 |

(Continued)

OTHER PUBLICATIONS

Tomblin, J.S., et al., "Bonded Repair of Aircraft Composite Sandwich Structures," Report No. DOT/FAA/AR-03/74, U.S. Department of Transportation, Federal Aviation Administration, Office of Aviation Research, Final Report, Feb. 1, 2004, pp. 1-121.

*Primary Examiner* — Jun S Yoo
(74) *Attorney, Agent, or Firm* — Coats & Bennett, PLLC

(57) ABSTRACT

Methods for reworking structures and reworked cellular core panels, reworked structures comprising the reworked cellular core panels, and guides and cutting apparatuses for reworking cellular acoustic panels and reworking cellular acoustic and non-acoustic panels are disclosed.

20 Claims, 20 Drawing Sheets

(51) Int. Cl.

| | | |
|---|---|---|
| *B32B 37/12* | (2006.01) | |
| *B32B 3/26* | (2006.01) | |
| *B32B 37/14* | (2006.01) | |
| *B32B 38/00* | (2006.01) | |
| *B32B 38/04* | (2006.01) | |
| *B32B 3/12* | (2006.01) | |
| *B64F 5/40* | (2017.01) | |
| *F02C 7/24* | (2006.01) | |
| *B26B 29/06* | (2006.01) | |
| *B29C 73/26* | (2006.01) | |
| *B29C 65/00* | (2006.01) | |
| *B29C 65/52* | (2006.01) | |
| *B29C 69/00* | (2006.01) | |
| *B26D 7/00* | (2006.01) | |
| *B29C 65/48* | (2006.01) | |
| *B29C 73/10* | (2006.01) | |
| *B29C 73/06* | (2006.01) | |
| *B26B 3/04* | (2006.01) | |
| *B23P 6/00* | (2006.01) | |
| *B29L 31/00* | (2006.01) | |
| *B29L 31/60* | (2006.01) | |
| *B29L 31/30* | (2006.01) | |

(52) U.S. Cl.
CPC ............ *B29C 65/48* (2013.01); *B29C 65/526* (2013.01); *B29C 66/02241* (2013.01); *B29C 66/223* (2013.01); *B29C 66/47* (2013.01); *B29C 66/472* (2013.01); *B29C 66/7254* (2013.01); *B29C 66/72525* (2013.01); *B29C 69/001* (2013.01); *B29C 73/06* (2013.01); *B29C 73/10* (2013.01); *B29C 73/26* (2013.01); *B32B 3/12* (2013.01); *B32B 3/266* (2013.01); *B32B 37/12* (2013.01); *B32B 37/146* (2013.01); *B32B 38/0036* (2013.01); *B32B 38/04* (2013.01); *B64F 5/40* (2017.01); *F02C 7/24* (2013.01); *B23P 6/00* (2013.01); *B23P 2700/01* (2013.01); *B23P 2700/12* (2013.01); *B29C 2073/264* (2013.01); *B29C 2793/0018* (2013.01); *B29C 2793/0081* (2013.01); *B29L 2031/3076* (2013.01); *B29L 2031/608* (2013.01); *B29L 2031/72* (2013.01); *B32B 2038/0076* (2013.01); *B32B 2038/047* (2013.01); *B32B 2305/024* (2013.01); *B32B 2307/102* (2013.01); *B32B 2605/18* (2013.01); *B32B 2607/00* (2013.01); *F05D 2220/323* (2013.01); *F05D 2230/80* (2013.01); *F05D 2240/14* (2013.01); *F05D 2260/963* (2013.01); *F05D 2300/603* (2013.01)

(58) Field of Classification Search
CPC ..... B32B 38/04; B32B 3/12; B32B 2307/102; B32B 2038/047; B32B 2038/0076; B32B 2305/024; B32B 2605/18; B32B 2607/00; B29C 2073/264; B29C 2793/0018; B29C 2793/0081; B29C 73/26; B29C 66/47; B29C 65/526; B29C 69/001; B29C 66/7254; B29C 66/223; B29C 66/72525; B29C 66/472; B29C 65/48; B29C 66/02241; B29C 73/10; B29C 73/06; B26D 7/0006; B26B 3/04; B26B 29/06; B64F 5/40; F02C 7/24; B29L 2031/72; B29L 2031/608; B29L 2031/3076; F05D 2300/603; F05D 2220/323; F05D 2240/14; F05D 2230/80; F05D 2260/963; B23P 6/00; B23P 2700/01; B23P 2700/12; B64D 2033/0206; B64D 33/02; B29D 24/005; B29D 99/0021; E04C 2/365
See application file for complete search history.

(56) References Cited

U.S. PATENT DOCUMENTS

| | | |
|---|---|---|
| 5,598,759 A | 2/1997 | Sie et al. |
| 5,653,836 A | 8/1997 | Mnich et al. |
| 8,642,158 B2 | 2/2014 | Bogue et al. |
| 8,696,843 B1 | 4/2014 | Dean |
| 9,659,556 B1 | 5/2017 | Pierce |
| 2005/0147790 A1 | 7/2005 | Levavasseur |
| 2007/0275212 A1 | 11/2007 | Stadtlander et al. |
| 2009/0166127 A1 | 7/2009 | Thomas et al. |
| 2009/0269547 A1 | 10/2009 | Meyer et al. |
| 2014/0295123 A1 | 10/2014 | Mizuno et al. |
| 2014/0329043 A1 | 11/2014 | Shigetomi |
| 2015/0298335 A1* | 10/2015 | Perron ............... B26D 5/02 83/13 |
| 2016/0051268 A1 | 2/2016 | Seitlinger et al. |

FOREIGN PATENT DOCUMENTS

| | | |
|---|---|---|
| WO | 2013026841 A1 | 2/2013 |
| WO | 2018204058 A1 | 11/2018 |

* cited by examiner

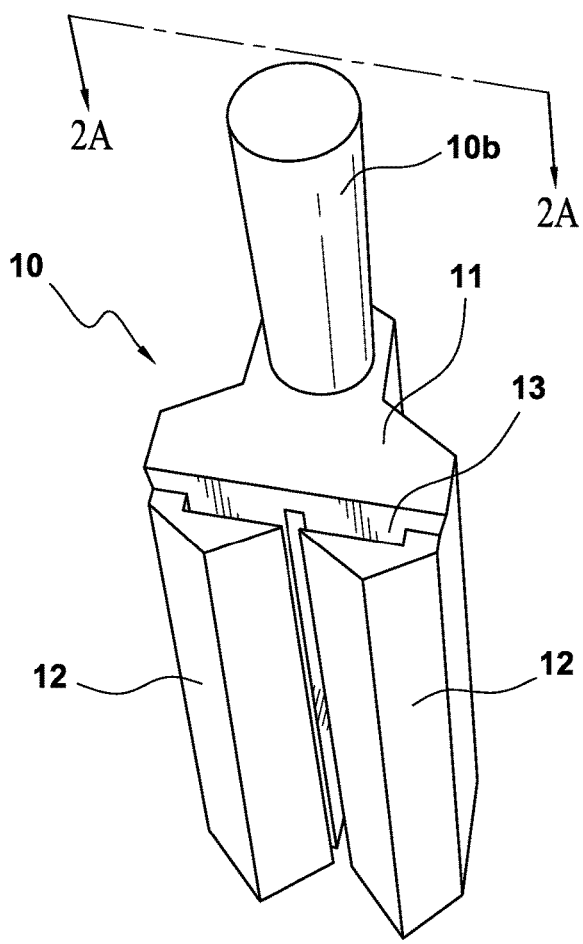
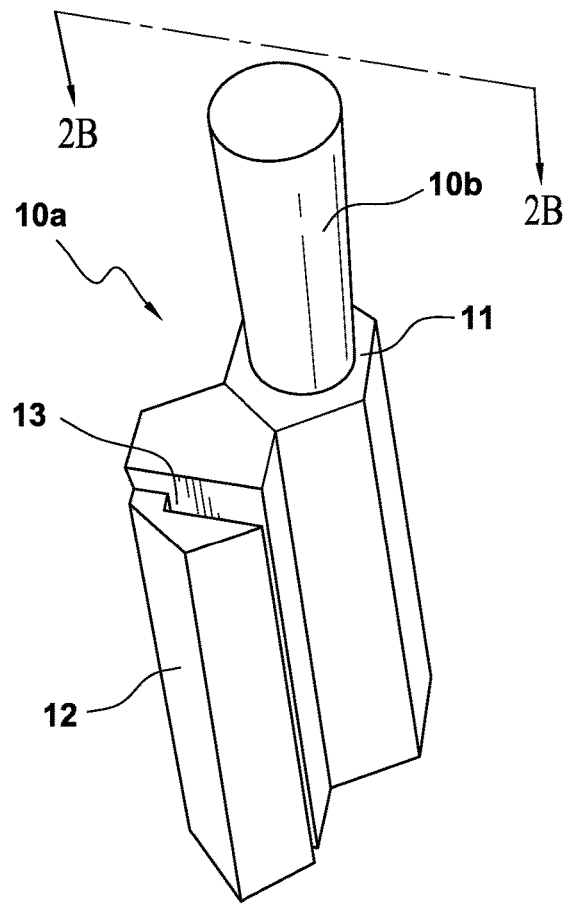
FIG. 1A
FIG. 1B
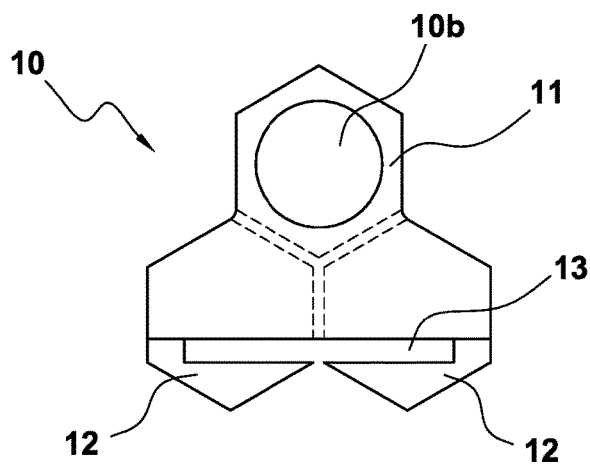
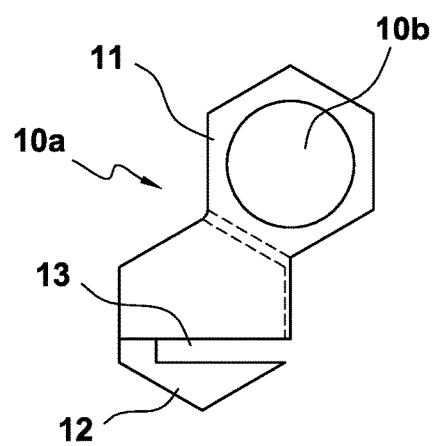
FIG. 2A
FIG. 2B

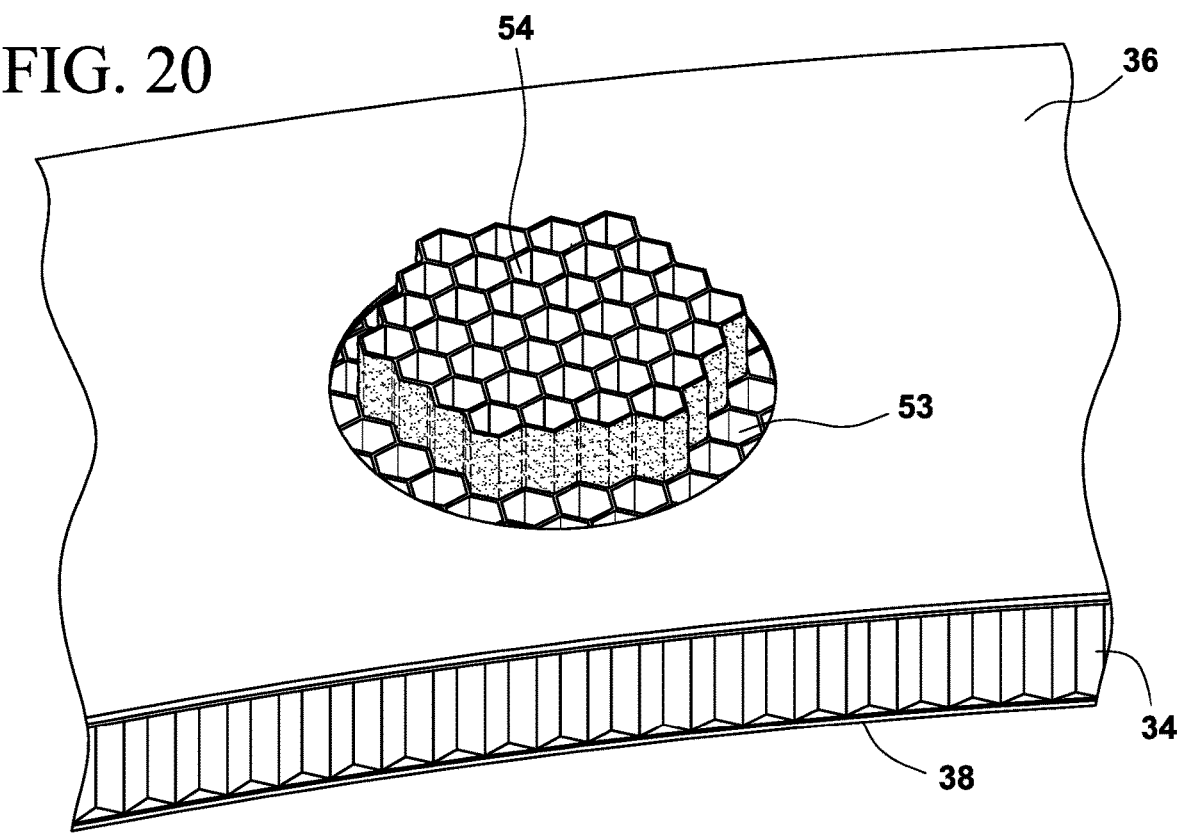
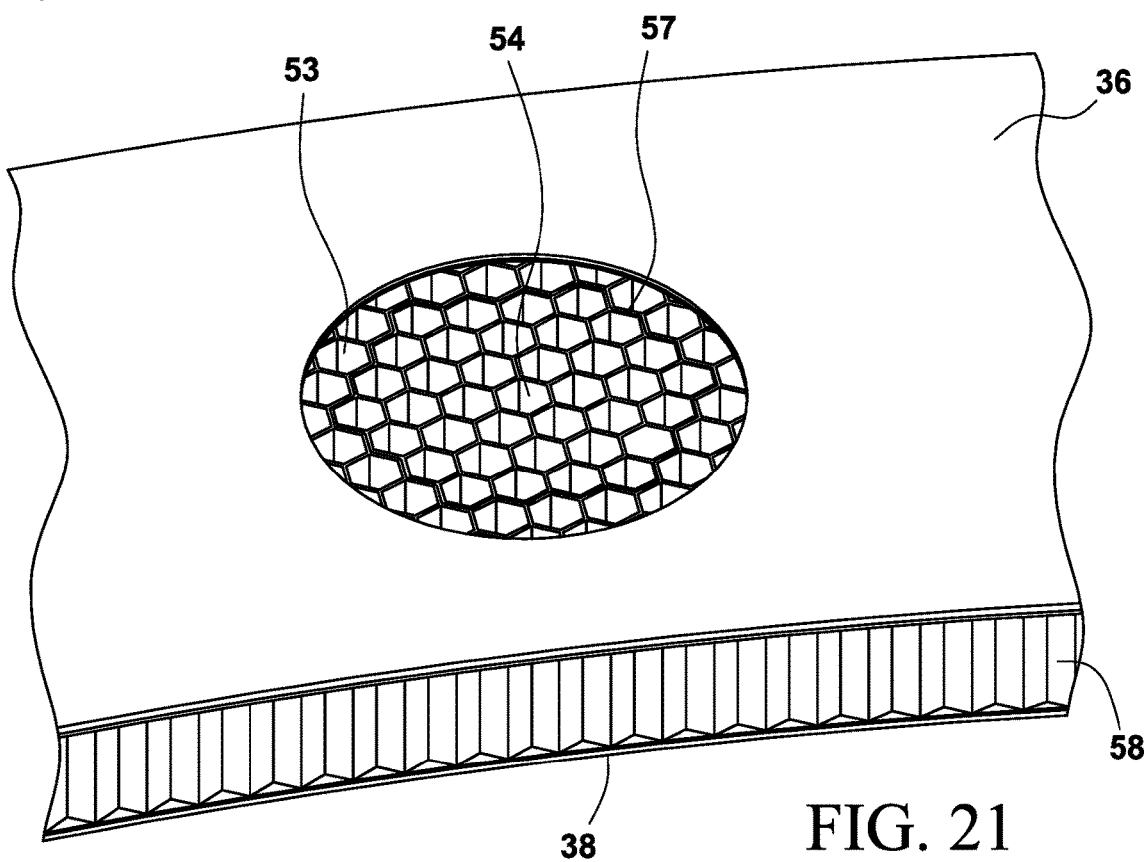

STRUCTURAL REWORK OF CELLULAR CORE PANELS

RELATED APPLICATION

This Application is a Divisional Application claiming priority from U.S. Ser. No. 15/825,335 filed Nov. 29, 2017 and issued Mar. 17, 2020 as U.S. Pat. No. 10,589,505, the entire contents of which is incorporated by reference herein, as if made a part of this Application.

TECHNOLOGICAL FIELD

The present disclosure relates generally to structures for noise reduction, and structures comprising such areas. More specifically, the present disclosure relates to methods for reworking acoustic panels and non-acoustic panels for structures, restoring acoustic performance to such structures, and structures comprising the reworked areas.

BACKGROUND

Aircraft engine assemblies produce high noise levels due to the high airflows through inlets, rotating stages and exhaust nozzles, etc. To reduce such noise levels and comply with noise regulations governing commercial aircraft, high bypass type aircraft engine assemblies incorporate acoustic panels in various locations of the engine, such as in the inlets of engine nacelles, thrust reversers, etc. These acoustic panels, sometimes referred to as acoustic treatments may comprise a septumized cellular, or "honeycomb" core oriented, or "sandwiched" between a perforated inner skin and a non-perforated outer skin or facesheet. The skins or facesheets may comprise a metal such as aluminum or a composite material, and the honeycomb core may comprise a metal, a ceramic, or a composite material.

Acoustic sandwich panels include a core sandwiched between two liner sheets. One of the liner sheets is perforated while the other sheet is not perforated. The core provides bulk (e.g. separates the inner and outer facesheets) and defines a plurality of cavities. Apertures defined by the perforated liner sheet fluidly couple the cavities ambient environment. Therefore, when air flows across the perforated liner sheet of an acoustic sandwich panel, the cavities in the core act as Helmholz resonators and attenuate the sound of the associated airflow. More specifically, core walls between adjacent cavities in the core act as acoustic septa to attenuate the sound of the airflow Over the course of a useful life, acoustic panels may require localized repair or reconditioning, known as "rework" to restore their original structural strength and performance. Known reworking for acoustic panels involves splicing the honeycomb core, and using foaming adhesives to secure the reworked sections. However this type of rework can result in the blockage of honeycomb cells, or otherwise limit the cells comprising the honeycomb core, resulting in less than desired acoustic performance of the affected cells. While certain types of aircraft have allowable acoustic loss at acoustic panels within acoustic structures, regulations for other aircraft types may not permit structural rework of such areas, resulting in part replacement at significant cost. Further regulations may allow for the replacement of a portion of the acoustic panels if acoustic performance is restored. However, restoring acoustic performance for reworked acoustic panels and structures comprising acoustic panels, such as aircraft nacelles, thrust reversers, etc., has presented continuing challenges.

SUMMARY

Aspects of the present disclosure are directed to methods for reworking structures comprising cellular core panels and reworking cellular core panels, reworked structures comprising the reworked core panels, and guides for reworking cellular acoustic panels and non-acoustic panels, as well as cutting apparatuses for reworking the core panels in larger structures, preferably in situ. Further aspects are directed to reworking acoustic panels and structures comprising the panels, with the panels comprising reworked core sections including, without limitation, honeycomb core sections in acoustic panels and structures comprising the panels.

A further aspect of the present disclosure is directed to a guide for a cutting instrument, with the guide comprising a base, at least one leg in communication with the base, and a guide slot extending longitudinally through the base, with the guide slot defined by the at least one leg and the base.

In another aspect, the guide comprises a plurality of legs in communication with the base.

A further aspect of the present disclosure is directed to reworking a portion of an aircraft using a guide for a cutting instrument, with the guide comprising a base, at least one leg in communication with the base, and a guide slot extending longitudinally through the base, with the guide slot defined by the at least one leg and the base.

Another aspect of the present disclosure is directed to an apparatus comprising a guide, with the guide comprising a base leg, with the leg dimensioned to engage and extend into, and be received by, a cell in a cellular core section. The cellular core section includes a plurality of cell walls, with the guide comprising a guide slot defined by the leg and the base, with the guide slot extending longitudinally within the guide, and a cutting instrument dimensioned to be received by the guide slot.

In another aspect, the cutting instrument is configured to engage the guide slot and is further configured to move longitudinally within a length of the guide slot, with the cutting instrument comprising a leading blade edge.

A further aspect of the present disclosure is directed to reworking a portion of an aircraft using an apparatus comprising a guide, with the guide comprising a base leg, with the leg dimensioned to engage and extend into, and be received by, a cell in a cellular core section. The cellular core section includes a plurality of cell walls, with the guide comprising a guide slot defined by the leg and the base, with the guide slot extending longitudinally within the guide, and a cutting instrument dimensioned to be received by the guide slot.

Another aspect of the present disclosure is directed to a method comprising removing a removable cellular section from a cellular core to form a cut-out cellular core, said cut-out cellular core comprising intact cells, said cells comprising an intact septum in each cell, and inserting a cellular rework section plug into the cut-out cellular section, with the cellular rework section plug comprising intact cells, and with the cells comprising an intact septum in each cell.

In another aspect, before the step of removing a removable cellular section from a cellular core, further comprising cutting an area from a cellular core to form a removable cellular section.

In another aspect, in the step of removing a removable cellular section from a cellular core to form a cut-out cellular core, with the cut-out cellular core comprising intact cells, and with the cells further comprising a plurality of exposed cell walls.

In a further aspect, in the step of inserting a cellular rework section plug into the cut-out cellular core, with the cellular rework section plug comprising intact cells and with the cells further comprising a plurality of exposed cell walls.

Another aspect of the present disclosure is directed to a method for reworking a structure comprising a cellular core, with the method comprising cutting an area from a cellular core to form a removable cellular section, with the removable cellular core section comprising a plurality of adjoining cells, and removing the removable cellular core section from the cellular core to form a cut-out cellular core, with the cut-out cellular core comprising a plurality of exposed adjoining complete cells, and with the plurality of exposed adjoining cells each comprising an intact septum disposed within each cell. Each septum is bounded by cell walls, and the cut-out cellular core comprises a cut-out cellular core geometry. A cellular rework section plug is then inserted into the cut-out cellular core and adhered to the cut-out cellular core to form a reworked cellular core, wherein each cell in the cellular reworked cellular core comprises an intact septum disposed within each cell.

In a further aspect, the cellular rework section plug is adhered to the cut-out cellular core to form the reworked cellular core.

In another aspect, the cut-out cellular core comprises a cut-out cellular core geometry and the cellular rework section plug has a cellular rework section plug geometry.

In a further aspect, the cellular rework section plug geometry substantially matches the cut-out cellular core geometry In another aspect, in the step of removing the removable cellular section from the cellular core to form the cut-out cellular core to form the cut-out cellular core, the cells of the cut-out cellular core comprise intact cell walls in each cell.

In a further aspect, in the step of inserting a cellular rework section plug into the cut-out cellular core, the cells of the cellular rework section plug comprise intact cell walls in each cell.

In another aspect, at least one of the cellular core and the rework section plug comprise a honeycomb structure.

In another aspect, an acoustic panel comprises the honeycomb structure.

In another aspect, before the step of inserting a cellular rework section plug, a method further comprises inserting a guide to a predetermined depth into a cellular panel stock material comprising a plurality of adjoining cells, with each of the adjoining cells comprising intact cell walls and a septum, with the guide comprising at least one leg. A leg of the guide is received into at least one of the adjoining cells, and a cutting instrument is inserted into the guide. A cell wall is severed from an adjoining cell of an adjoining cell at a cell wall juncture to form the cellular rework section plug.

According to a further aspect, the step of cutting an area from a cellular core to form a removable cellular core section, to form a removable cellular core section in the cellular core further comprises inserting a guide to a predetermined depth into the at least one cell in the cellular core, with cellular core comprising a plurality of adjoining cells, with each of the adjoining cells comprising cell walls and a septum. The guide comprises at least one leg that is received into at least one adjoining cell. A cutting instrument is inserted into the guide and a cell wall is severed completely from an adjoining cell wall of an adjoining cell at a cell wall juncture.

In another aspect, before the step of cutting an area from a cellular core, a method further comprises removing a portion of at least one covering layer from an acoustic panel to expose to expose a cellular core.

In another aspect, before the step of inserting the cellular rework section plug into the cut-out cellular core, a method further comprises applying an adhesive to at least one of the cut-out cellular core and the cellular rework section plug.

In another aspect, after the step of adhering, the cellular rework section to the cut-out cellular core to form a reworked cellular core, a method further comprises adhering at least one covering layer over the reworked cellular core with the covering layer comprising at least one composite material layer.

In a further aspect, the covering layer comprises perforations.

In another aspect, after the step of adhering at least one covering layer over the reworked cellular core, a method further comprises curing the covering layer.

In another aspect, a method further comprises co-curing the adhesive and the covering layer.

In a further aspect, after the step of curing the covering layer, a method further comprises perforating the covering layer to form acoustic perforations extending through the covering layer.

In another aspect, acoustic perforations are in formed in the covering layer by drilling.

In another aspect, after the step of severing the cell wall at the cell wall juncture, the adjoining cells of the cellular rework section plug each comprise an intact septum.

In a further aspect, before inserting a cellular rework section plug, a method further comprises forming a cellular rework section plug comprising a plurality of adjoining cells and an outer periphery geometry substantially equivalent to the cut-out cellular core geometry.

Another aspect of the present disclosure is directed to a method of cutting an area from a cellular core to form a removable cellular core section and a cut-out cellular core section in the cellular core comprising inserting a guide to a predetermined depth into at least one cell of the cellular core, receiving a leg of the guide into at least one cell, and inserting a cutting instrument into the guide and severing a cell wall of the cell completely from an adjoining cell wall of an adjoining cell at a cell wall juncture.

In a further aspect, the cut-out cellular core section comprises a plurality of adjoining cells, with each of the adjoining cells comprising intact cell walls and an intact septum.

In another aspect, at least one of the cellular core and the cellular rework section plug comprise a honeycomb structure.

In a further aspect, after the step of severing the cell wall at the cell wall juncture, the adjoining cells of the cellular rework section plug each comprise intact cell walls and an intact septum.

A further aspect is directed to a portion of an aircraft reworked according to any of the methods presented herein.

A further aspect of the present disclosure is directed to a reworked cellular core made according to any of the aforementioned methods.

In another aspect, the reworked cellular core comprises a honeycomb structure.

In another aspect, the reworked cellular core is a component in an acoustic panel.

A further aspect is directed to a reworked panel comprising the reworked cellular core made according to aspects of the present disclosure.

Further aspects are directed to an object comprising the reworked panels made according to any presently disclosed methods.

According to further aspects, the object comprises at least one of an aircraft engine assembly or a thrust reverser.

A further aspect is directed to a vehicle comprising objects reworked according to presently disclosed methods.

Another aspect is directed to a vehicle comprising the rework according to disclosed methods, with the vehicle including at least one of: a manned aircraft, and unmanned aircraft, a spacecraft, an unmanned spacecraft, a manned rotorcraft, an unmanned rotorcraft, a manned terrestrial vehicle, an unmanned terrestrial vehicle, a manned surface water borne vehicle, an unmanned surface water borne vehicle, a manned sub-surface water borne vehicle or an unmanned sub-surface water borne vehicle.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 3:
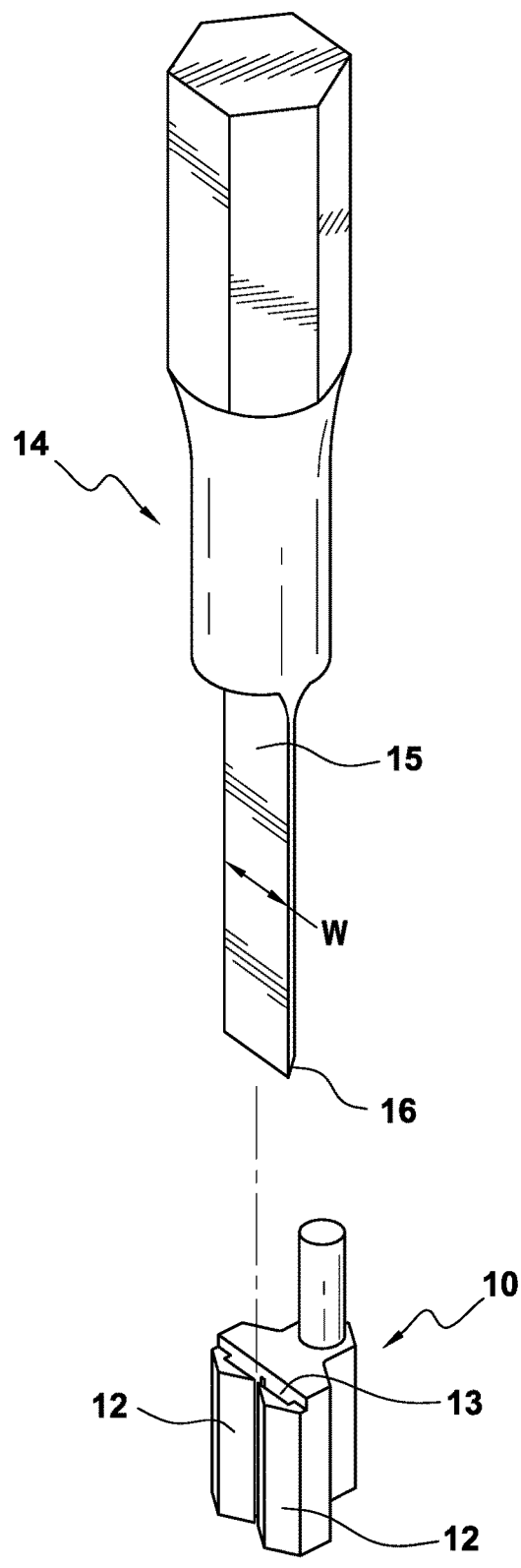
Figure 4:
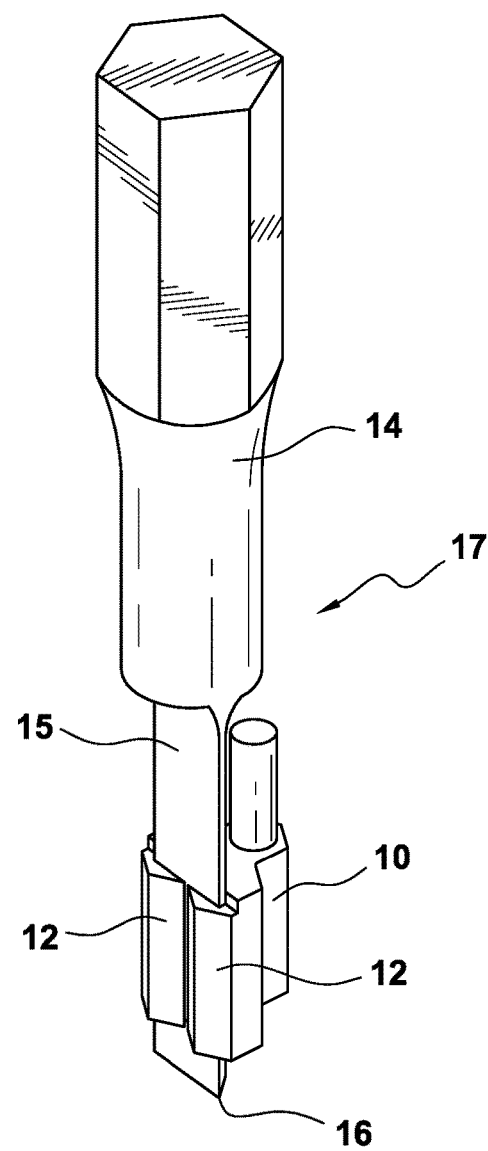
Figure 5:
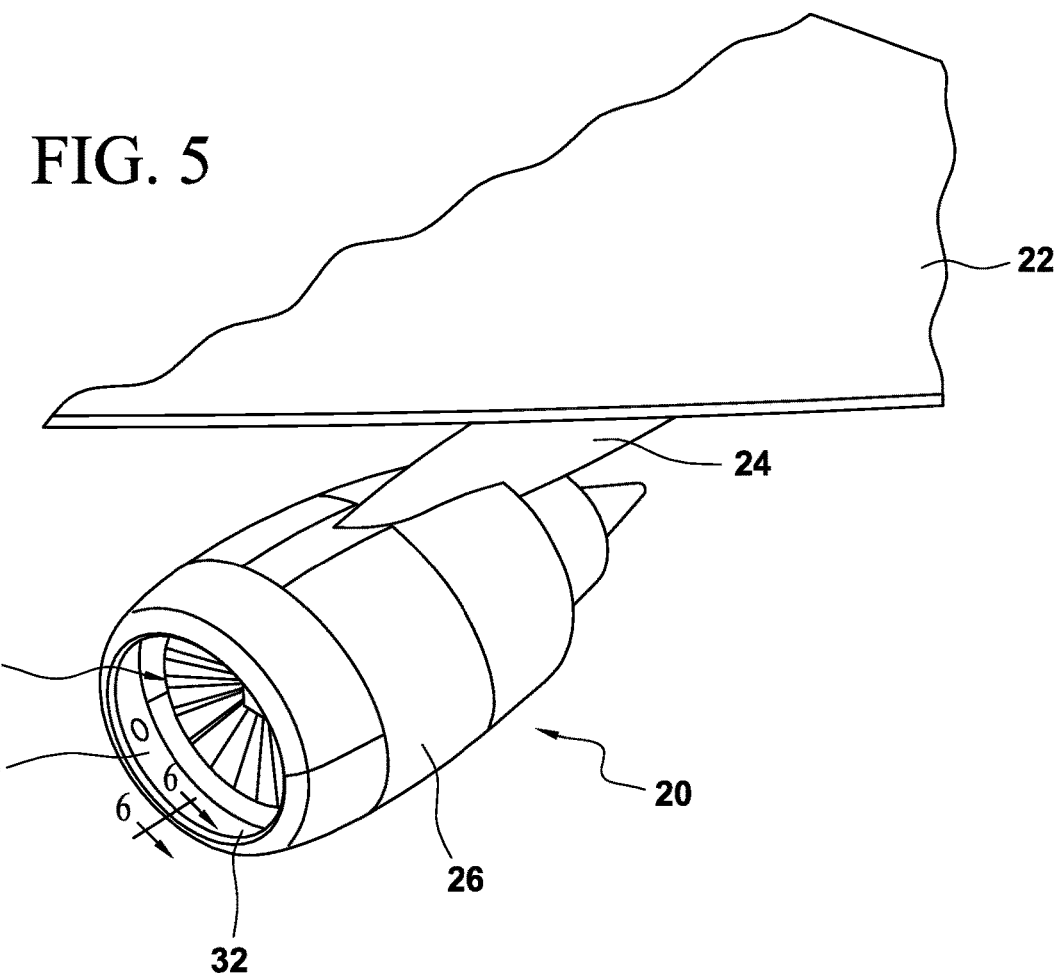
Figure 6:
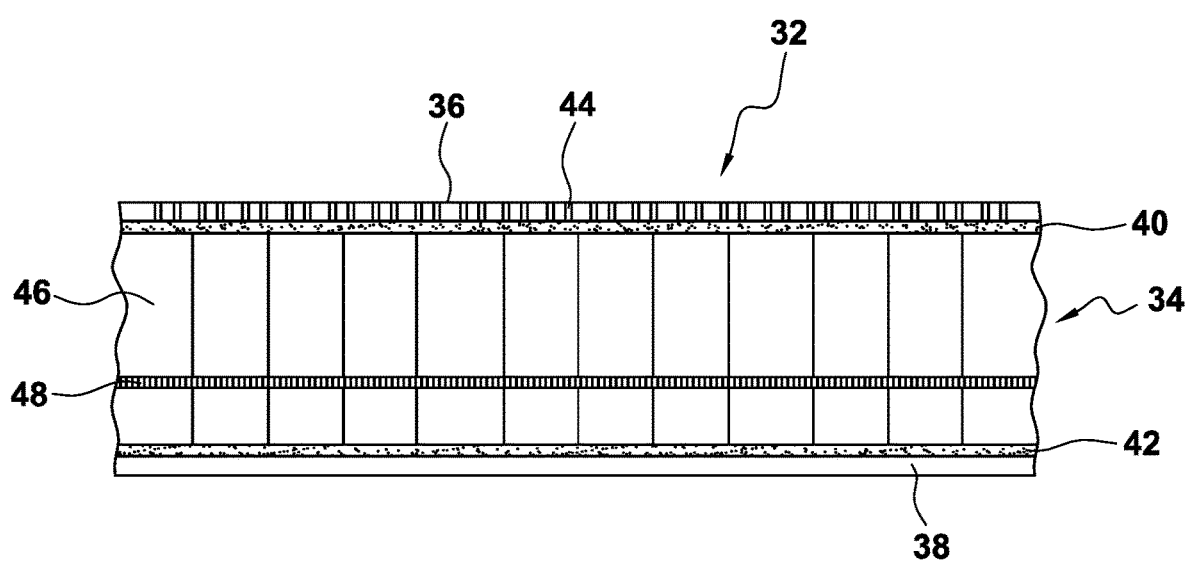
Figure 7:
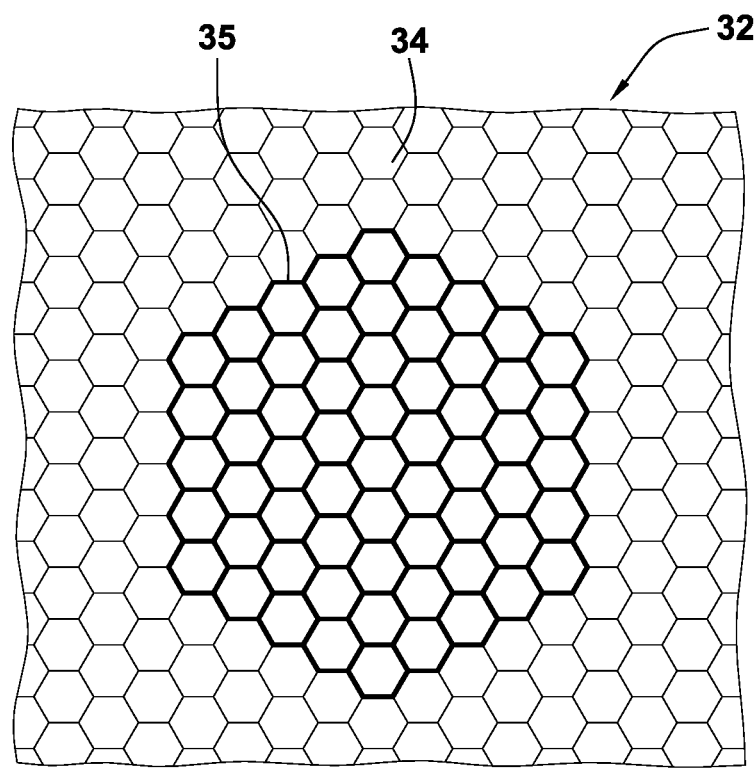
Figure 8:
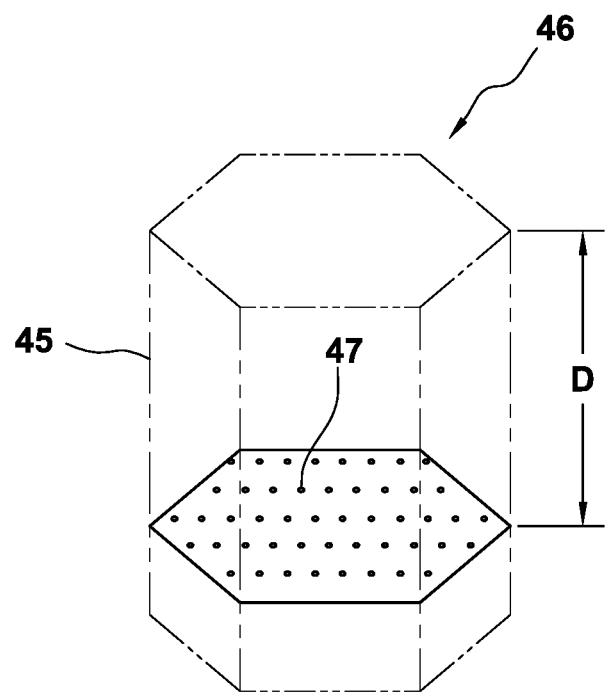
Figure 9:
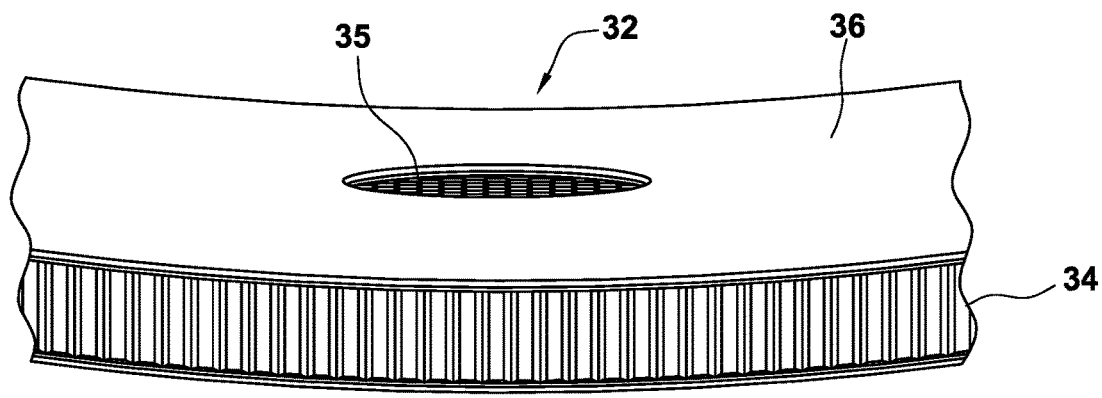
Figure 10:
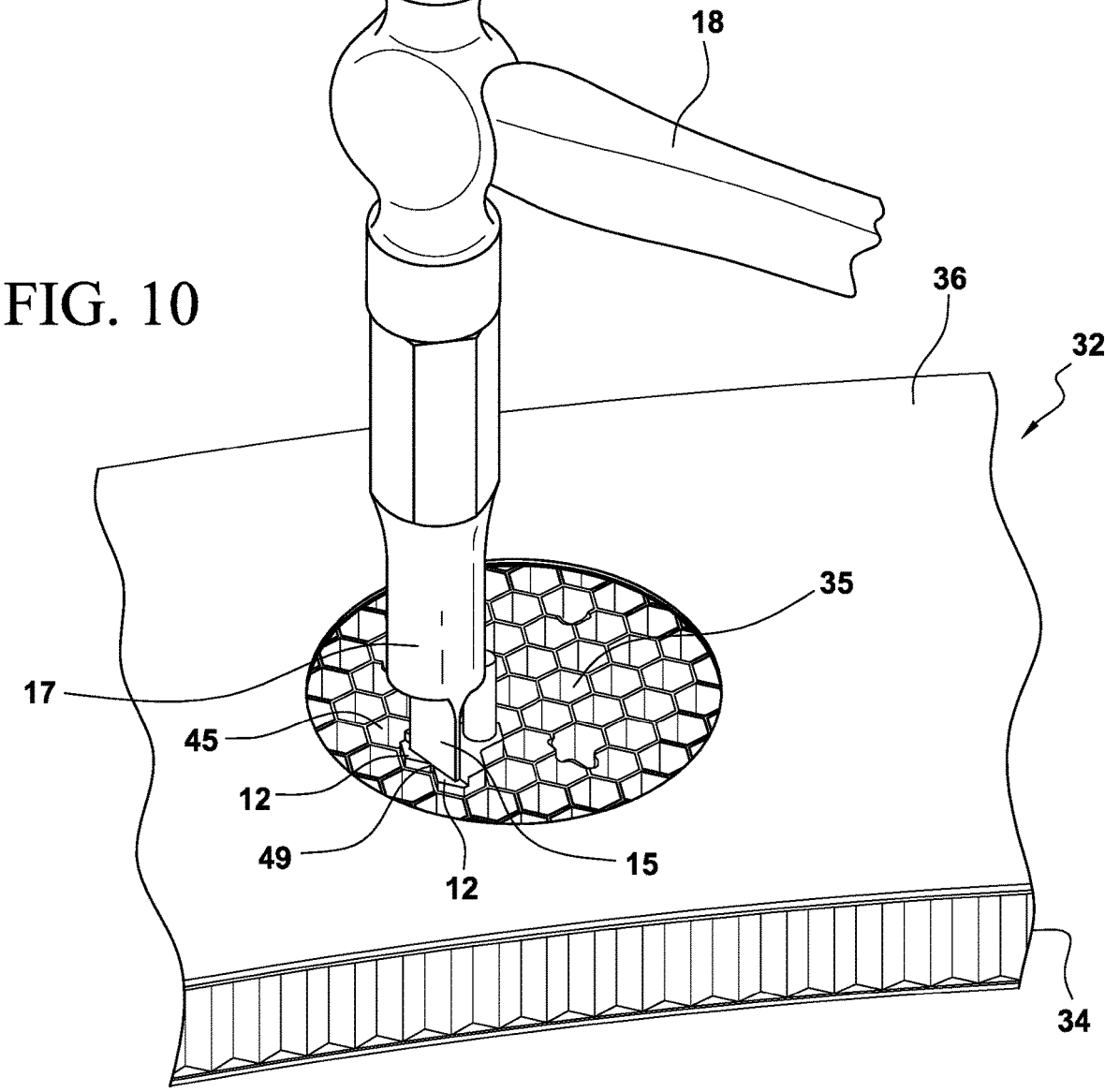
Figure 11:
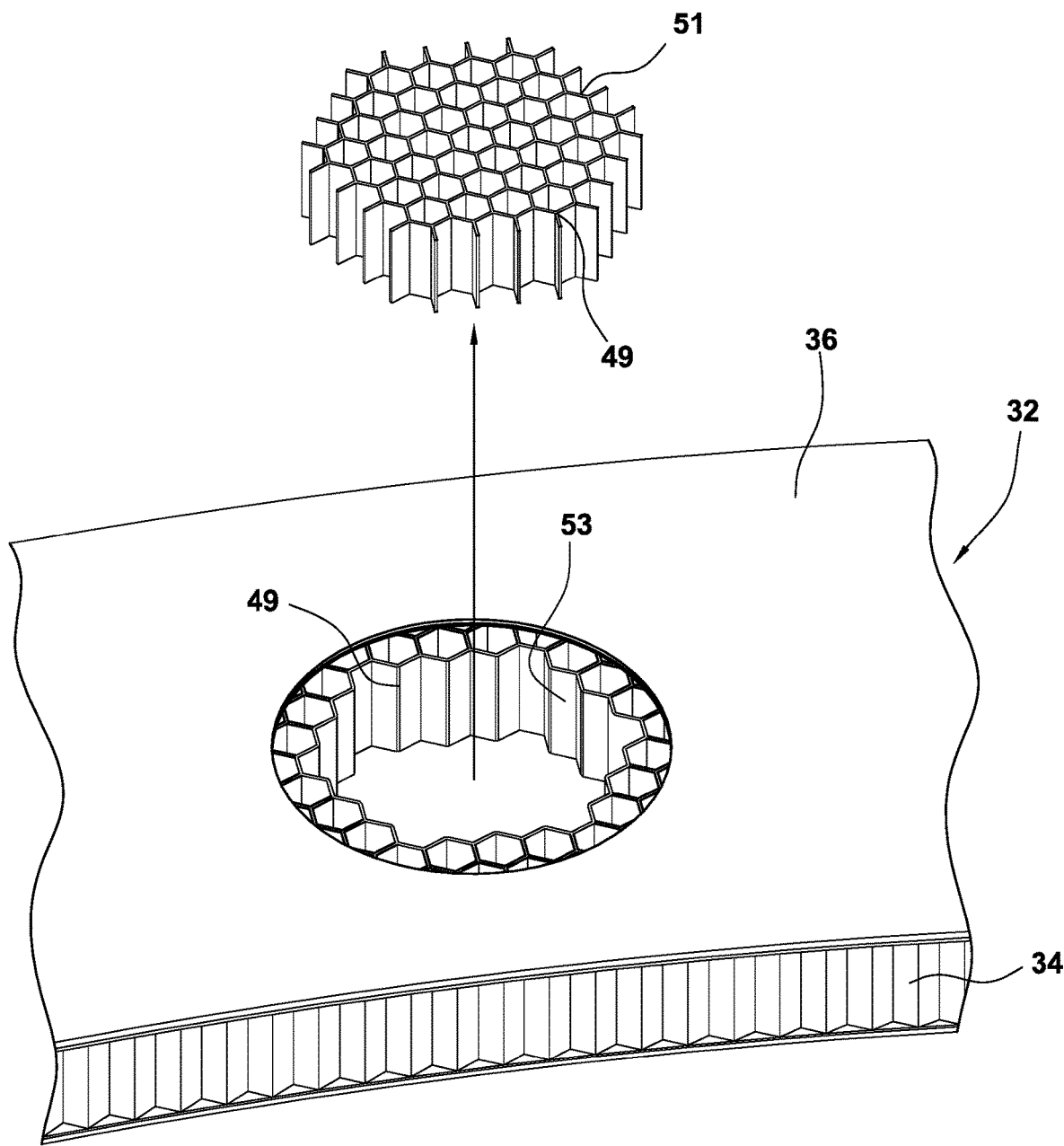
Figure 12:
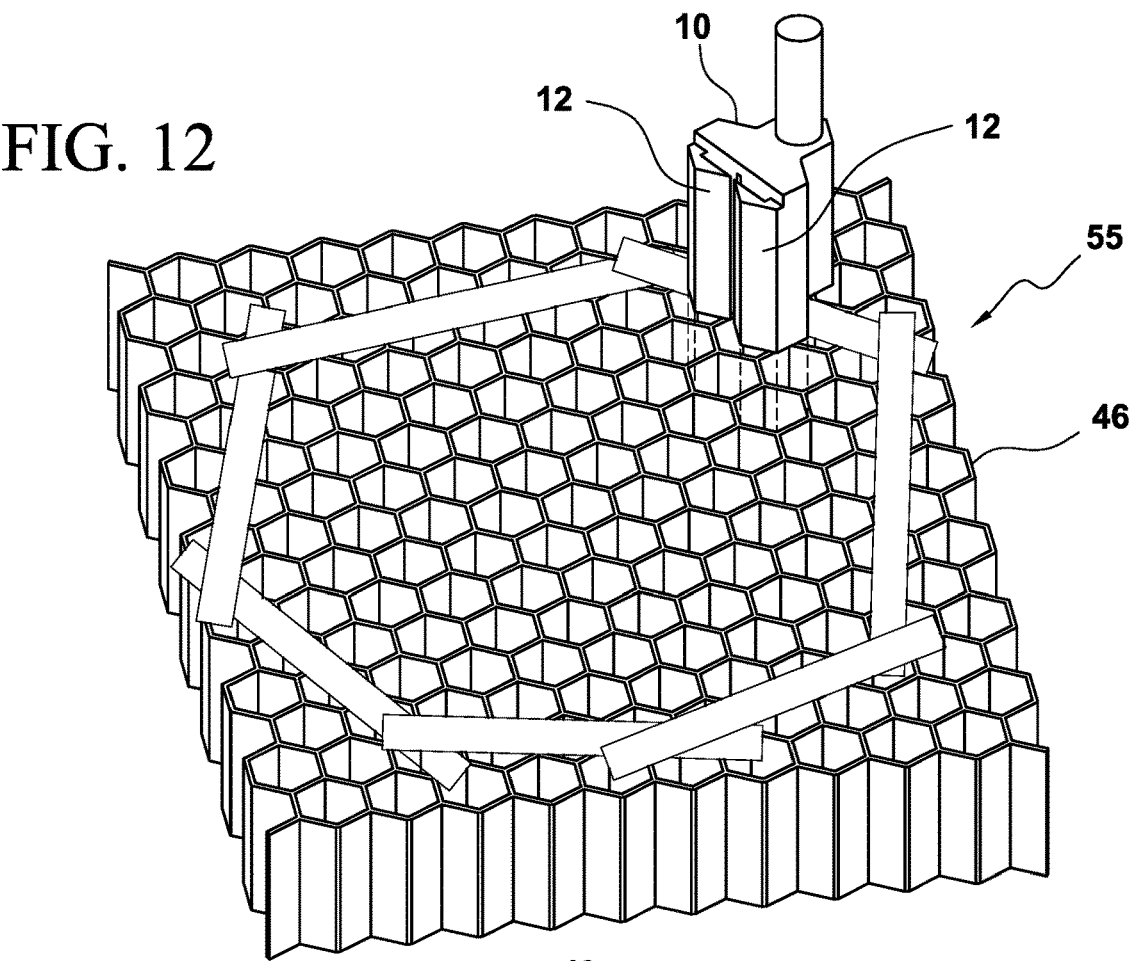
Figure 13:
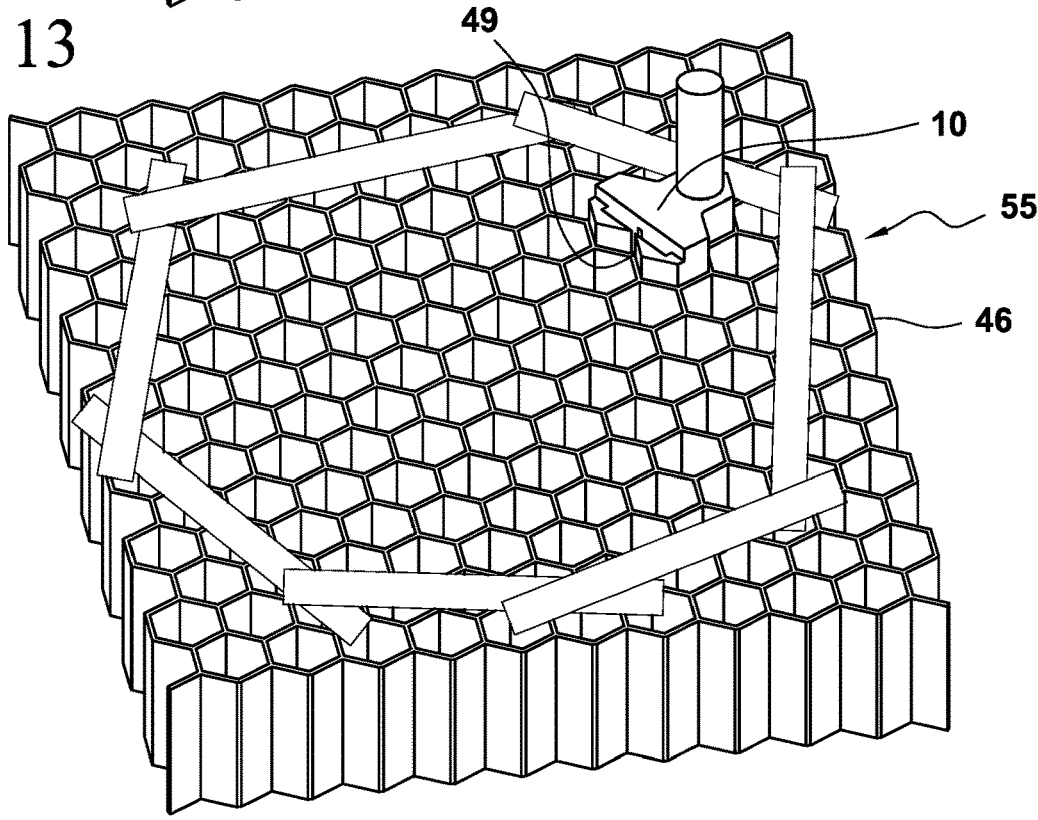
Figure 14:
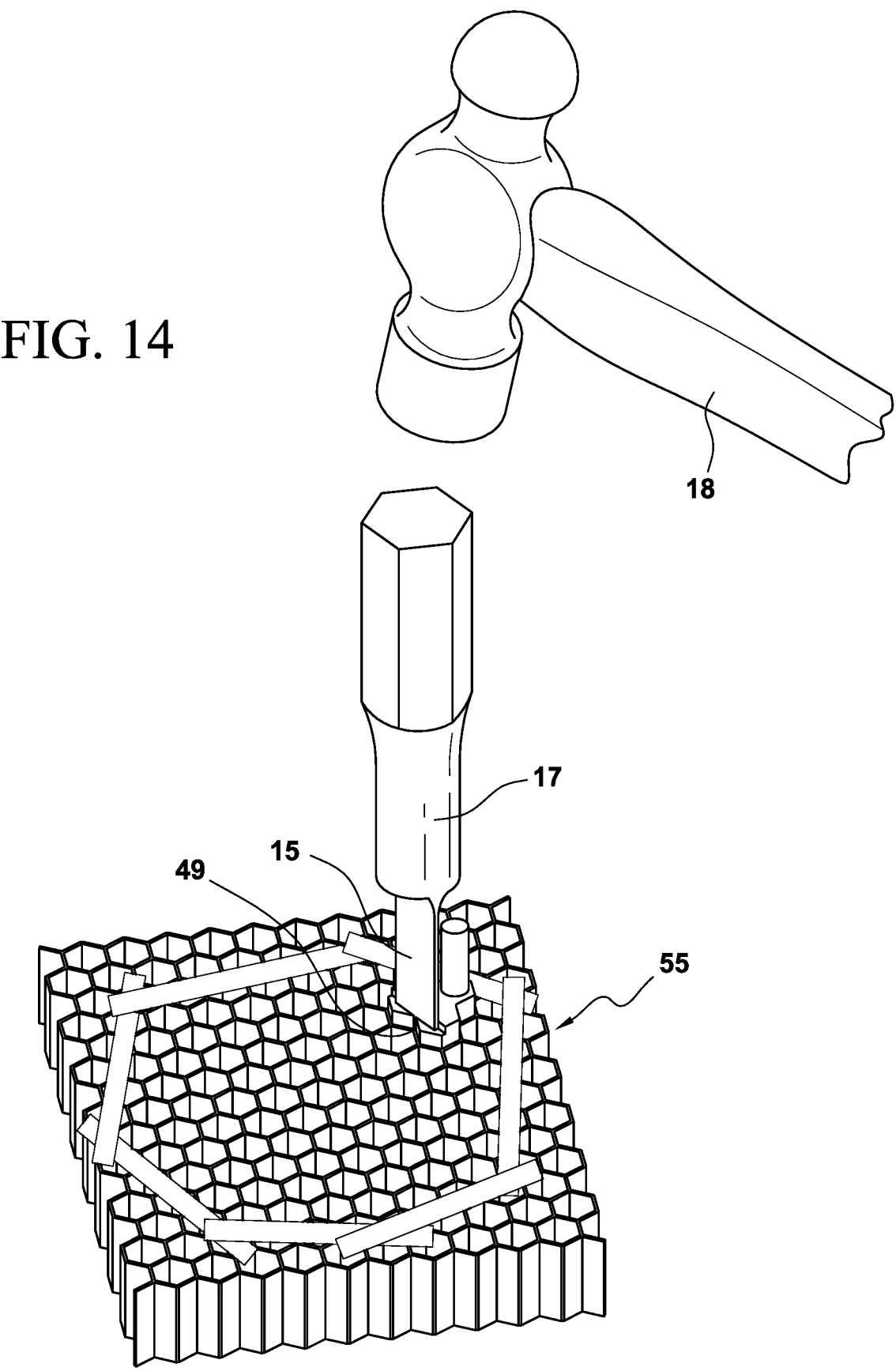
Figure 15:
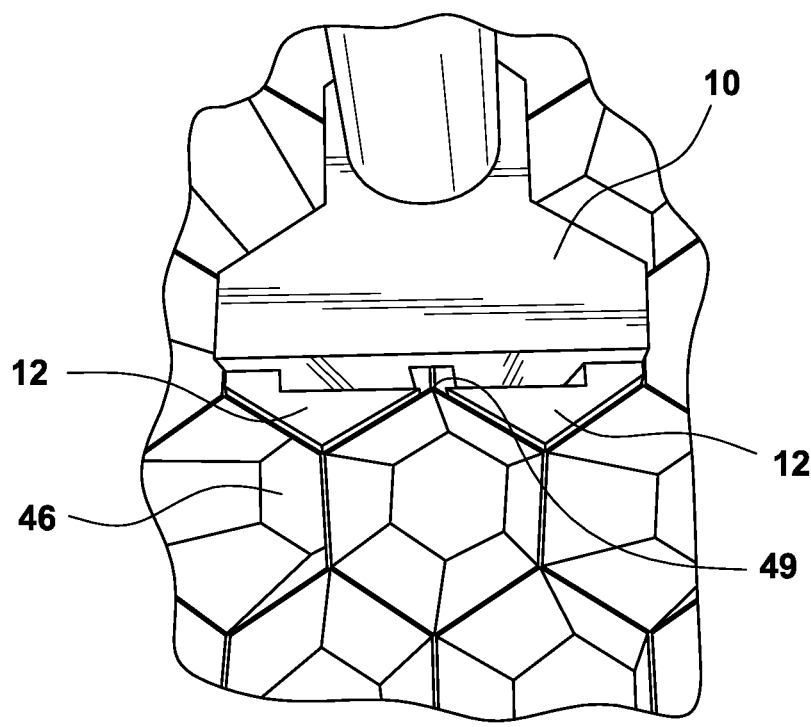
Figure 16:
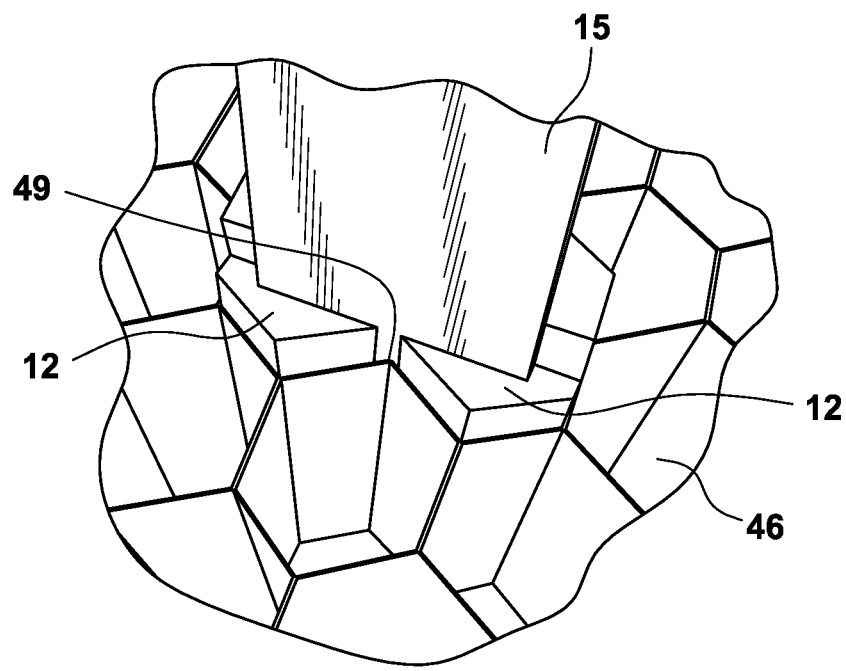
Figure 17:
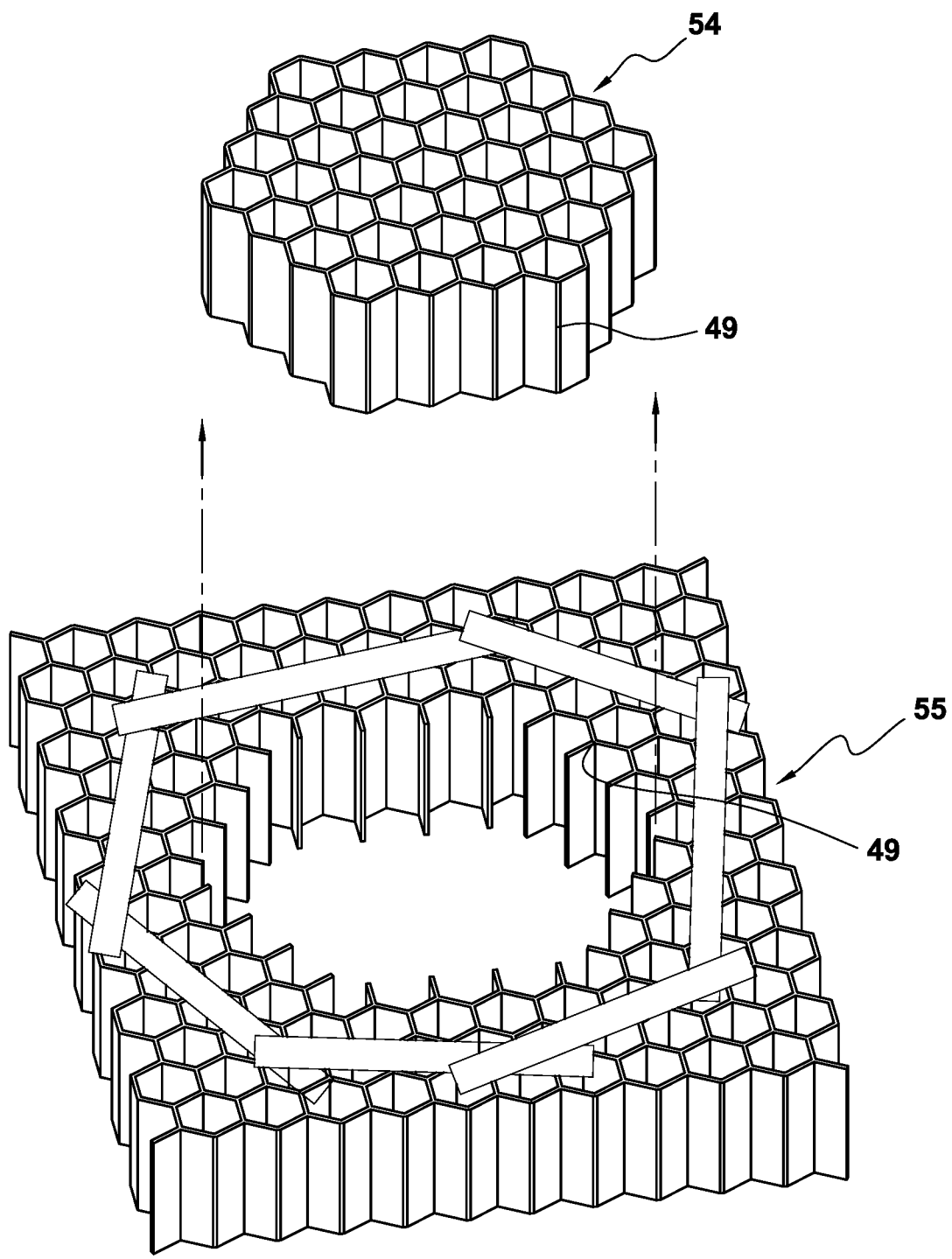
Figure 18:
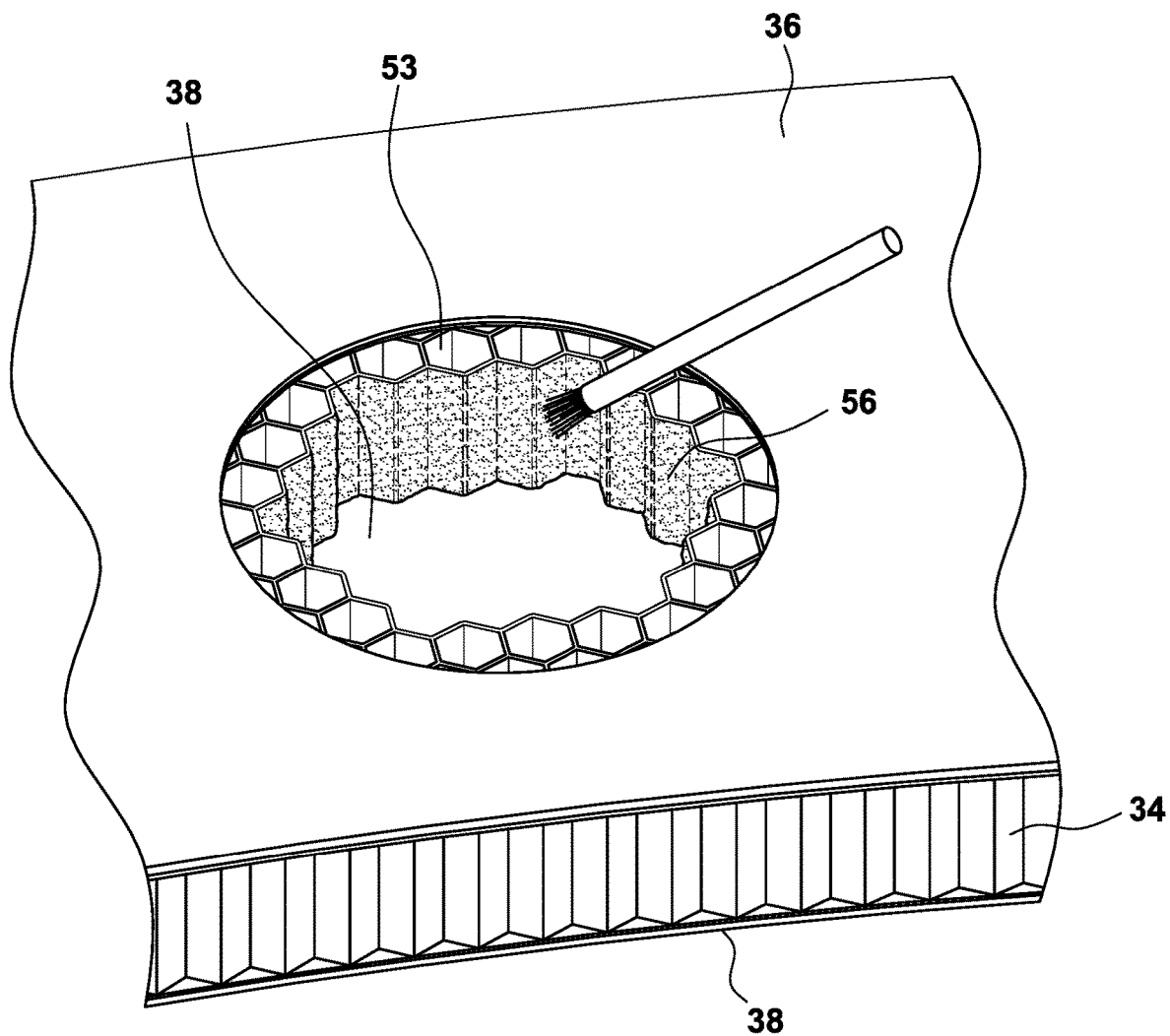
Figure 19:
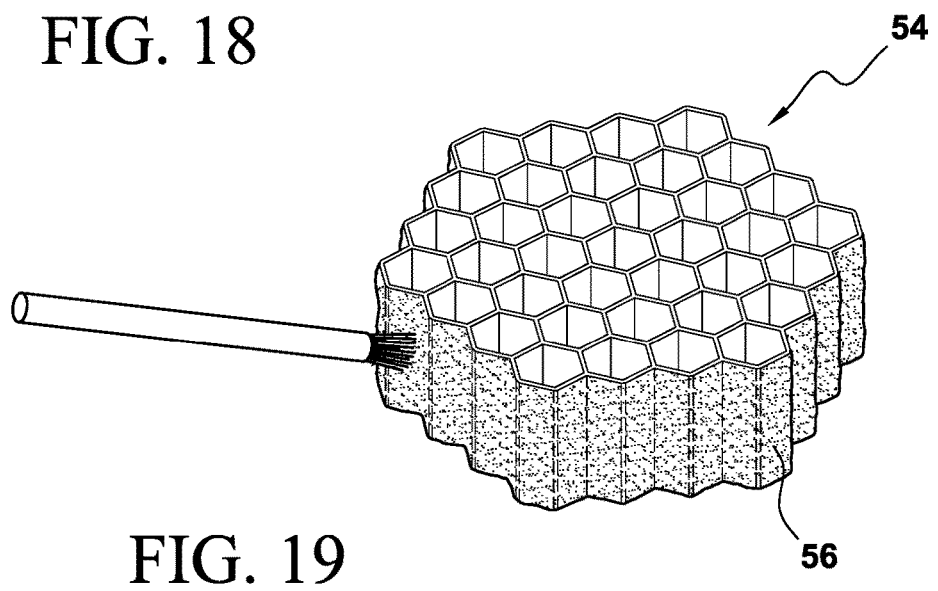
Figure 22:
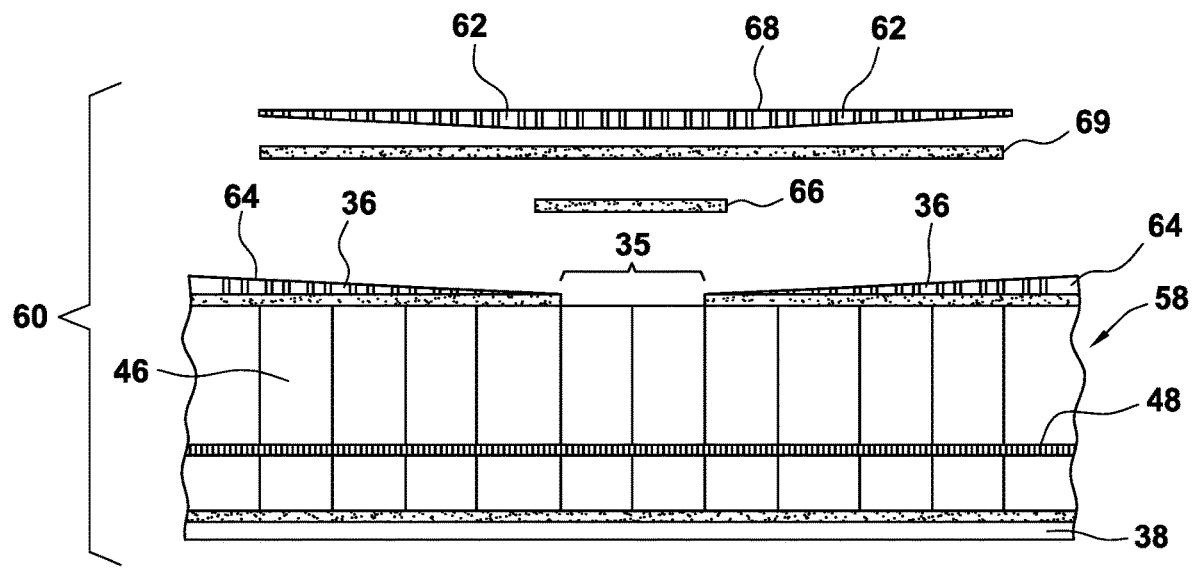
Figure 23:
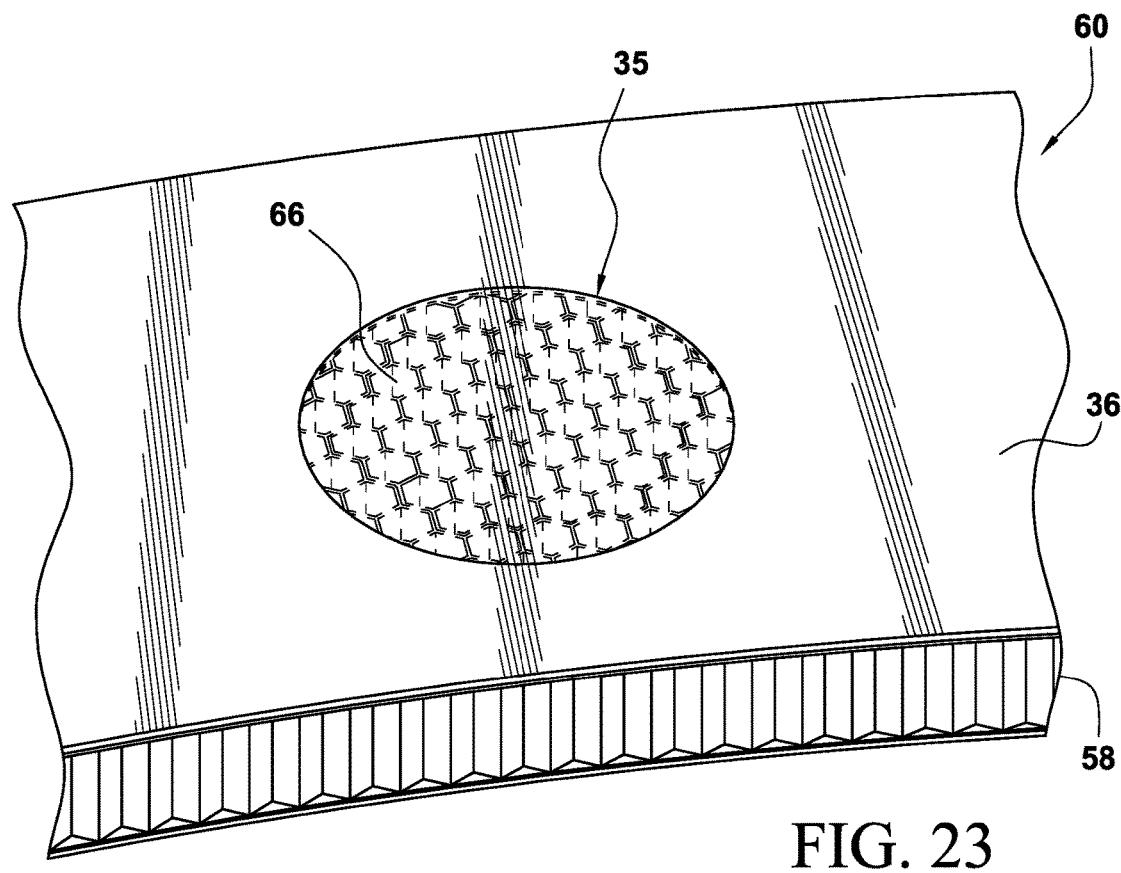
Figure 24:
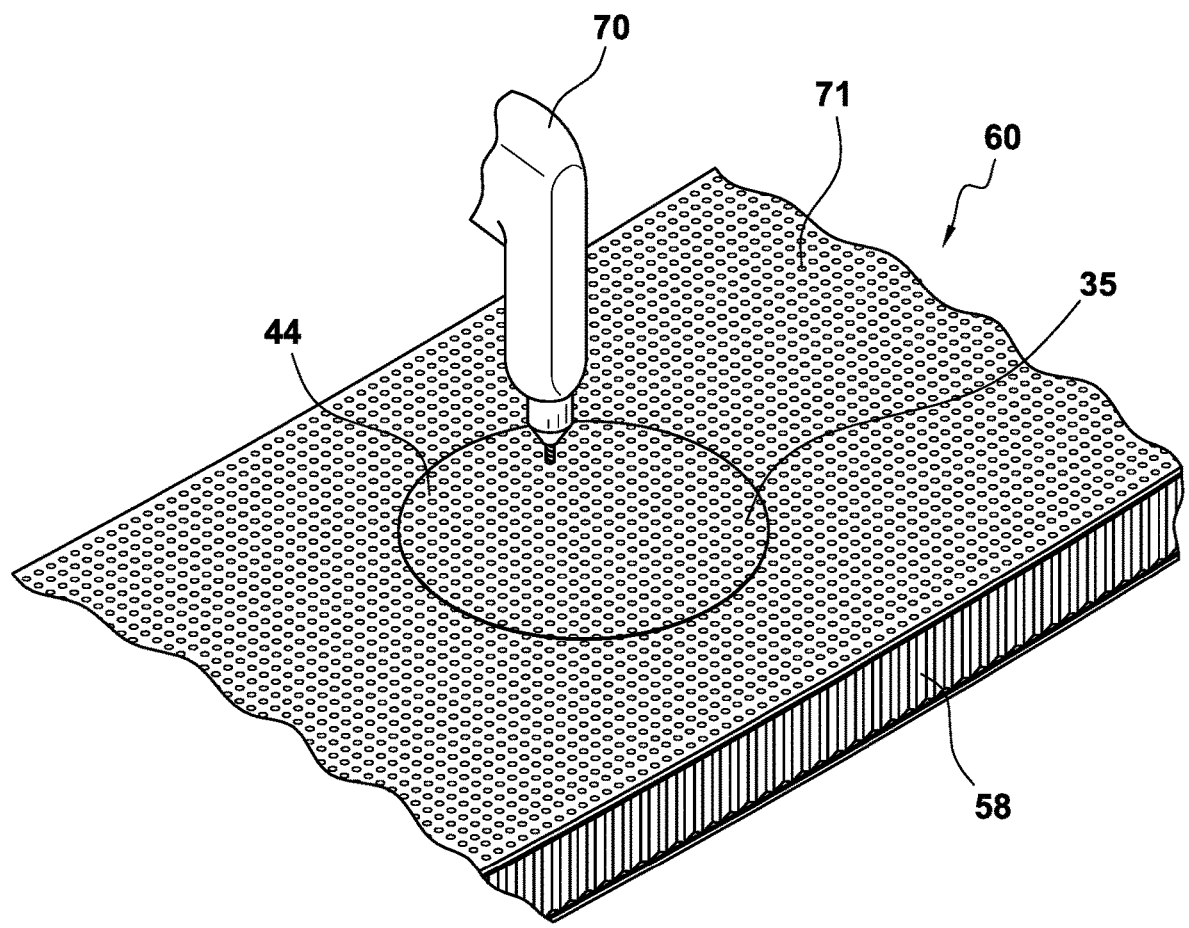
Figure 25:
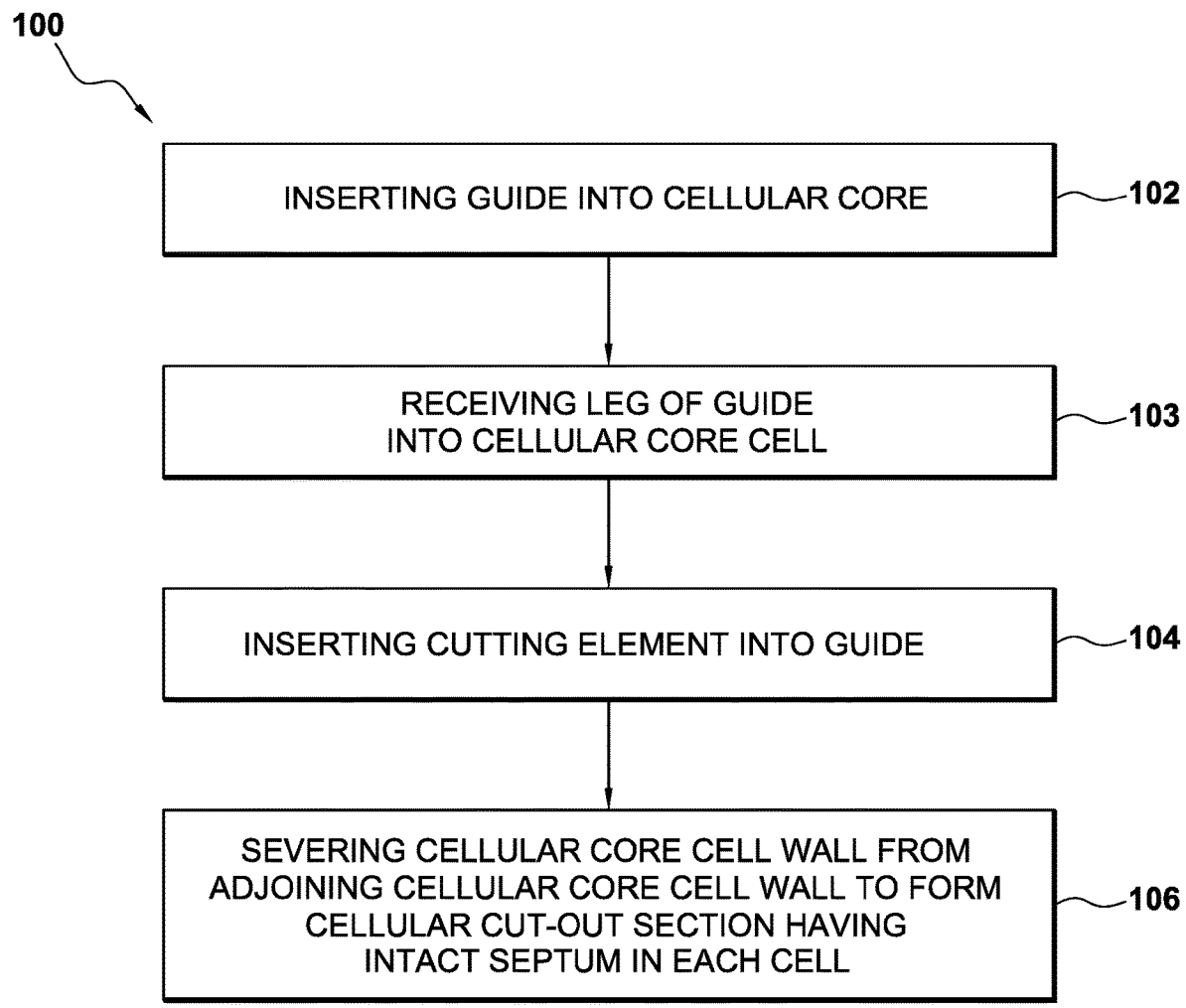
Figure 26:
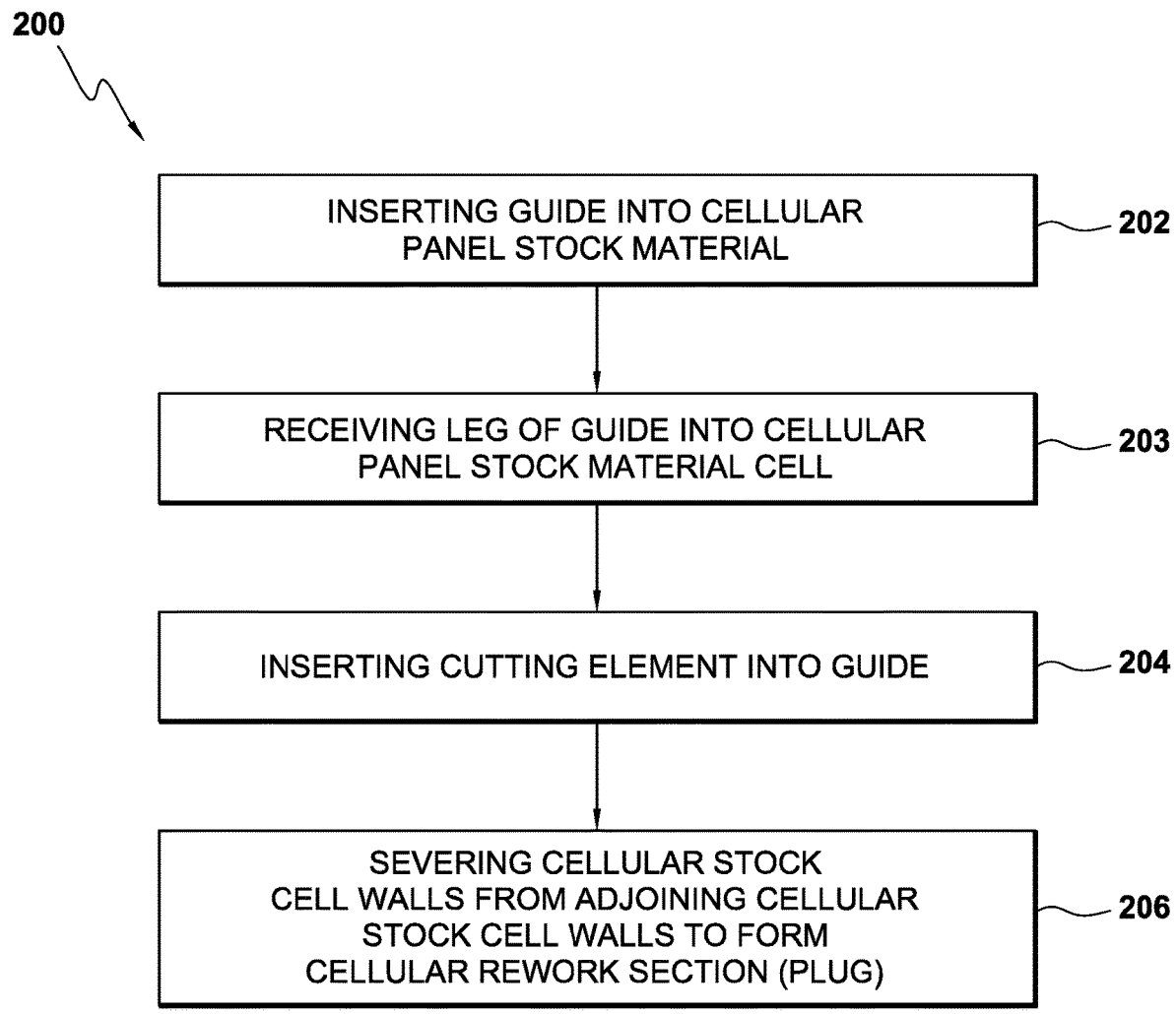
Figure 27A:
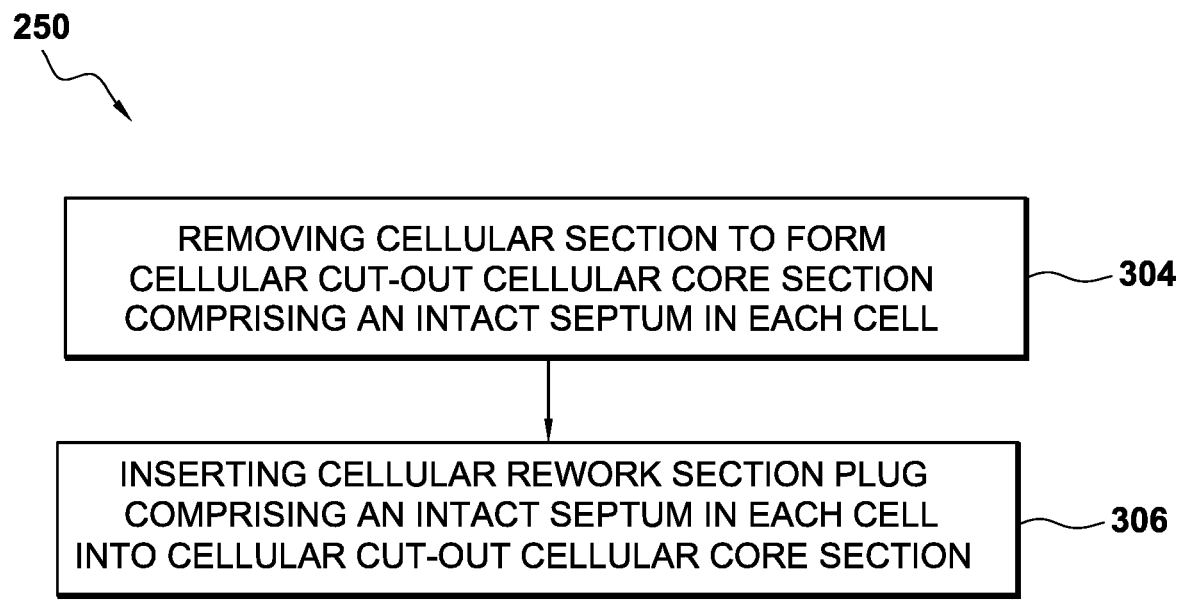
Figure 27B:
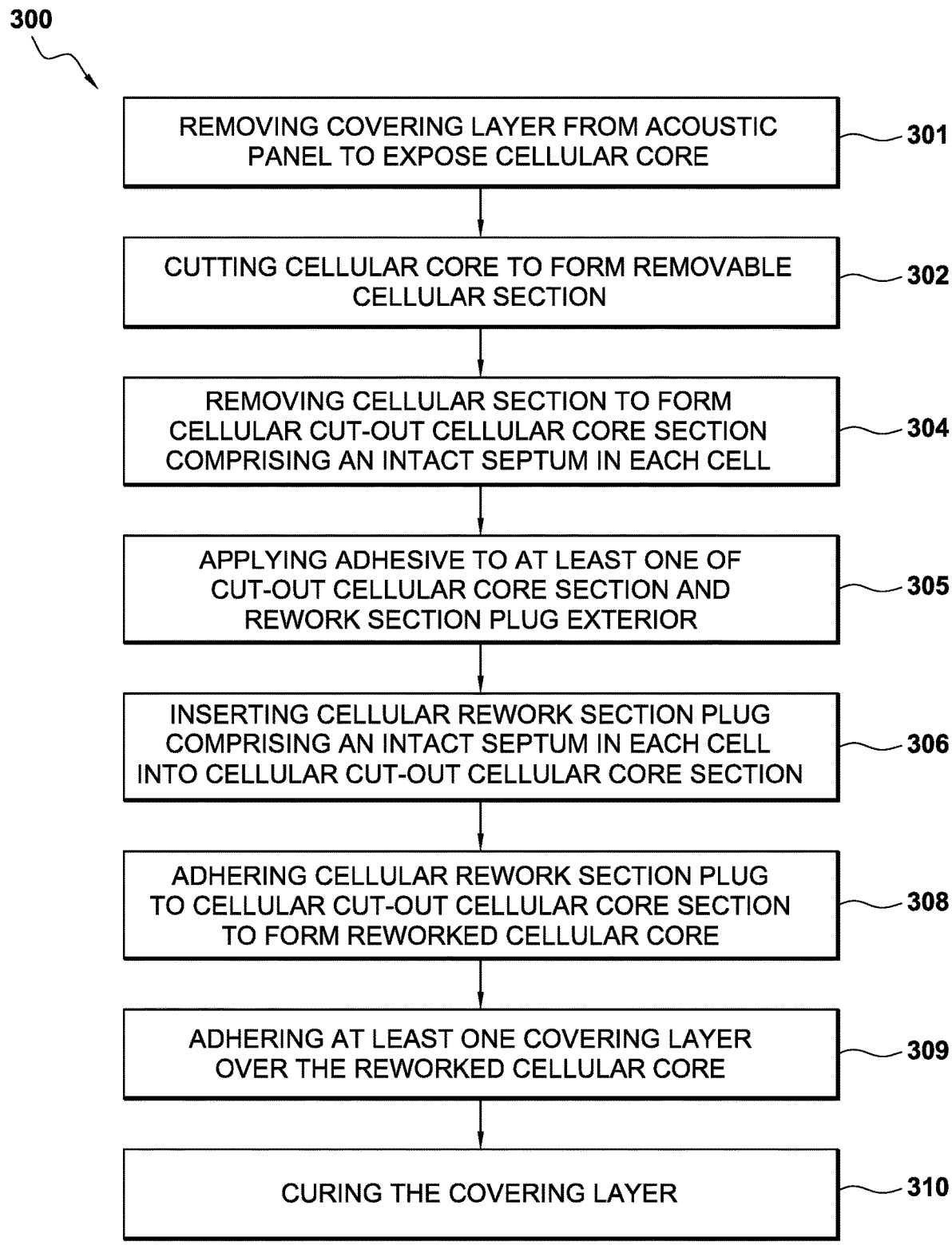
Figure 28:
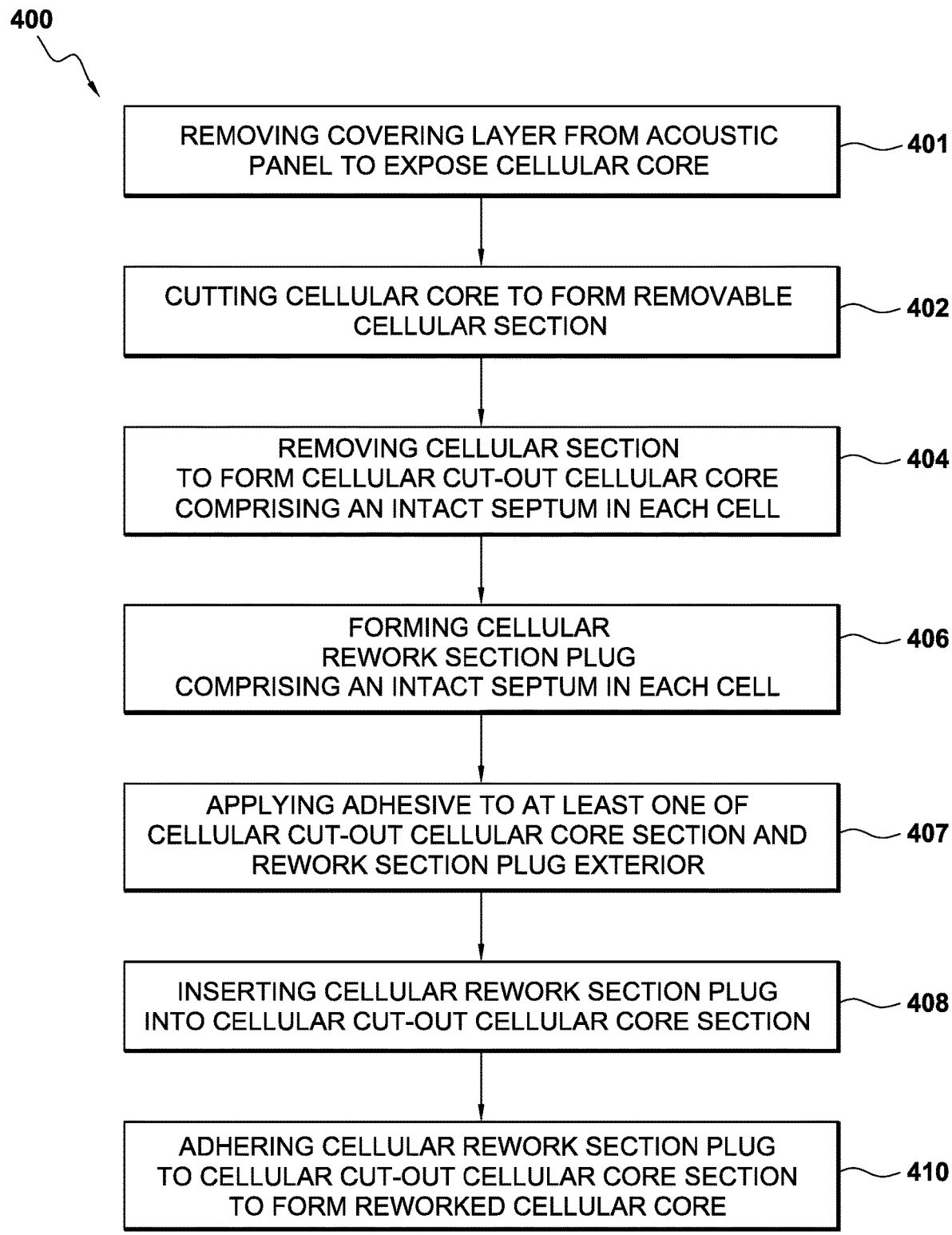
Figure 29:
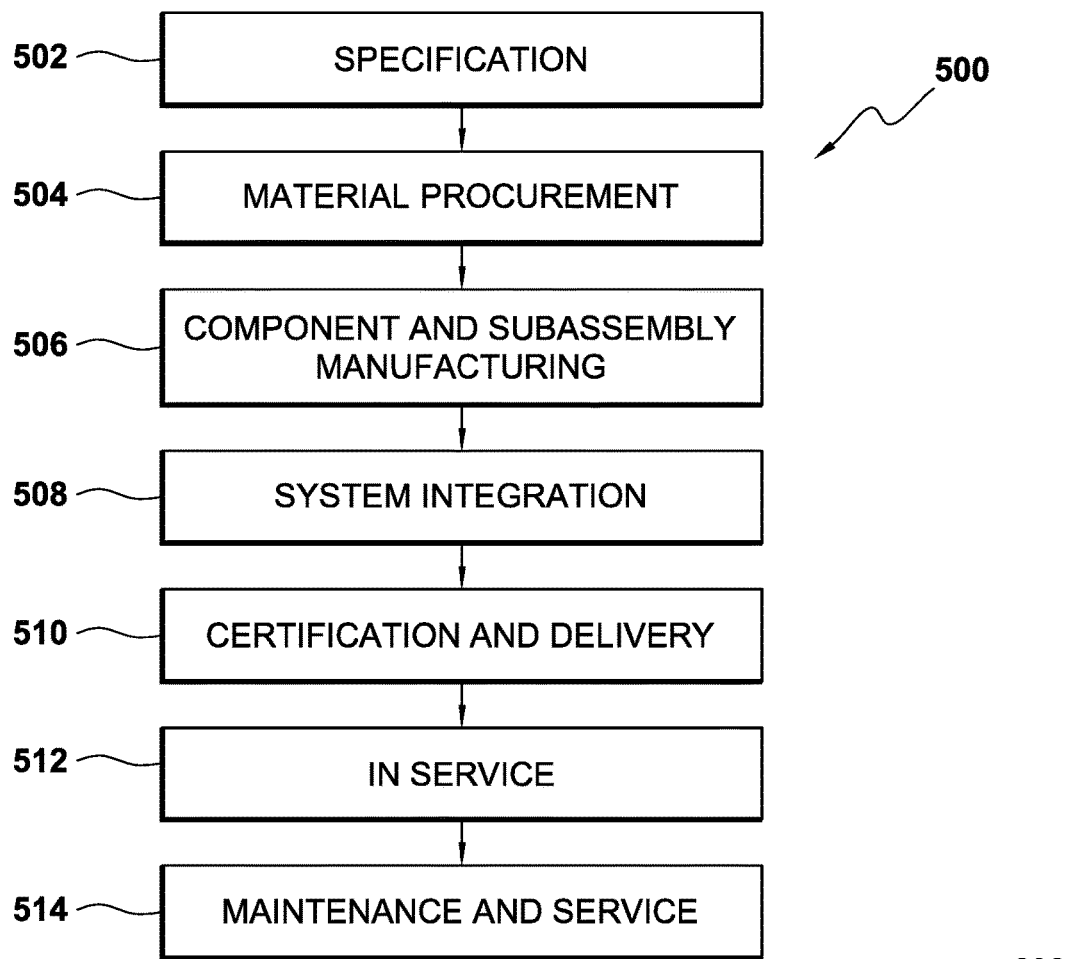

Having thus described variations of the disclosure in general terms, reference will now be made to the accompanying drawings, which are not necessarily drawn to scale, and wherein:

FIG. 1A is a perspective view of a guide having multiple legs;

FIG. 1B is a perspective view of a guide having one leg;

FIG. 2A is an overhead plan view of the guide shown in FIG. 1A;

FIG. 2B is an overhead view of the guide shown in FIG. 1B;

FIG. 3 is a view of a cutting apparatus comprising the guide shown in FIGS. 1A and 2A and a cutting instrument;

FIG. 4 is a view of the assembled cutting apparatus of FIG. 3;

FIG. 5 is an illustration of a perspective view of a portion of the wing showing an engine inlet comprising an acoustic structure requiring repair;

FIG. 6 is an illustration of a cross-sectional side view of a portion of an acoustic panel forming part of the engine inlet shown in FIG. 5;

FIG. 7 is an overhead plan view of a portion of the acoustic panel of FIG. 6 requiring rework;

FIG. 8 is a perspective view of a cell of the cellular core in the acoustic panel shown in FIG. 7;

FIG. 9 is a perspective view of the acoustic panel shown in FIGS. 7 and 8;

FIG. 10 is a perspective view of the acoustic panel shown in FIG. 9 with a cellular core section being cut;

FIG. 11 is a perspective view of the acoustic panel shown in FIG. 10, with the removable cellular core section being removed from the cellular core of the panel to form a remaining cut-out cellular core;

FIGS. 12, 13 and 14 are perspective views of a cellular core stock material, or cellular "blank", from which a cellular rework section ("plug") is fashioned;

FIGS. 15 and 16 are enlarged views of the of cellular core stock material shown in FIGS. 12, 13 and 14;

FIG. 17 is a perspective view showing removal of the cellular rework section ("plug") removed from the cellular core stock material shown at least in FIGS. 12, 13 and 14;

FIG. 18 is a perspective view of the panel of FIG. 11 showing the exposed cut-out cellular core with adhesive applied to exposed cell wall surfaces;

FIG. 19 is a perspective view of the cellular rework section shown in FIG. 17 with adhesive applied to outer cell wall surfaces;

FIG. 20 is a perspective view of the panel of FIG. 18 with the cellular rework section of FIG. 19 being inserted into the panel to form a reworked cellular core in the acoustic panel;

FIG. 21 is a perspective view of the reworked cellular core in the acoustic panel of FIG. 20 with the cellular rework section inserted into position in the reworked cellular core of the acoustic panel;

FIG. 22 is a cross-sectional side view of a reworked acoustic panel shown in FIG. 21, with covering layer shown in an exploded view;

FIG. 23 is a perspective view of the panel of FIG. 22 with a covering layer in position;

FIG. 24 is a perspective view of the reworked acoustic panel of FIG. 23 showing perforations formed in the covering sheet;

FIG. 25 is a flowchart according to aspects of the present disclosure outlining a method for severing cellular core cell walls in a cellular core to form a cut-out cellular core section;

FIG. 26 is a flowchart according to aspects of the present disclosure outlining a method for severing cellular cell walls from cellular panel stock material stock to form a cellular rework section "plug";

FIG. 27A is a flowchart according to aspects of the present disclosure outlining a method for reworking a cellular core according to aspects of the present disclosure;

FIG. 27B is a flowchart according to aspects of the present disclosure outlining a method for reworking a cellular core according to aspects of the present disclosure;

FIG. 28 is a flowchart according to aspects of the present disclosure outlining a method for reworking a cellular core according to aspects of the present disclosure and as shown in FIG. 27 including the further steps of making the cellular core rework section ("plug");

FIG. 29 is a flow diagram of aircraft production and service methodology; and

Figure 30:
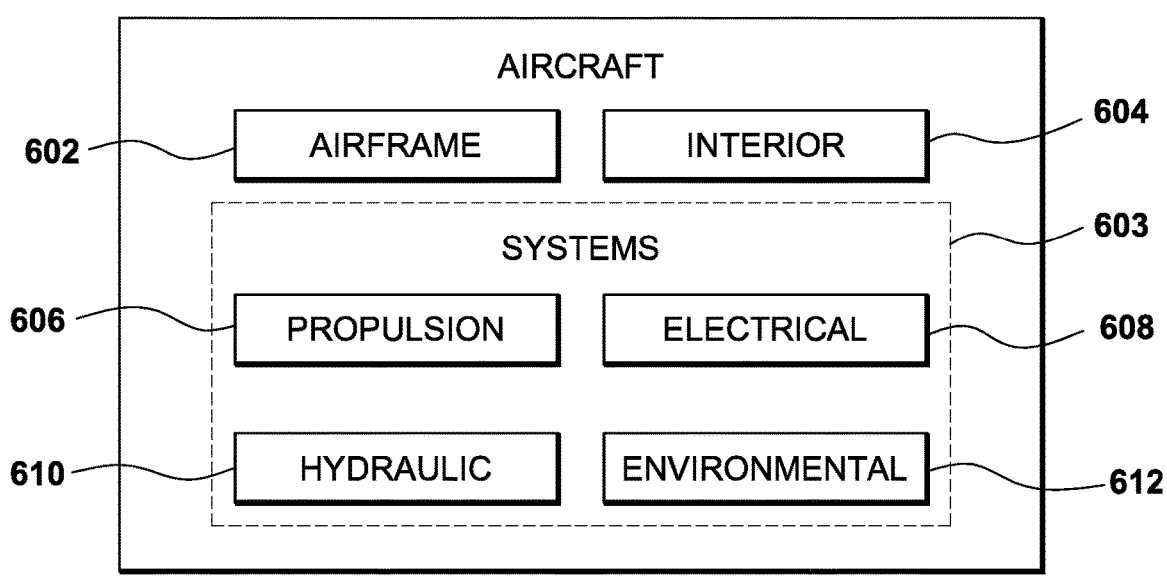

FIG. 30 is a block diagram of an aircraft.

DETAILED DESCRIPTION

According to the present disclosure, methods for reworking structures are disclosed comprising reworked core panels, reworked structures comprising the reworked core panels, and guides and apparatuses for reworking cellular core panels for reworking the core panels in structures. Further aspects are directed to reworking acoustic panels and structures comprising the cellular core panels, with the panels comprising reworked cellular core sections including, without limitation, honeycomb core sections in acoustic paneling and structures comprising the acoustic paneling. Aspects of the present disclosure further contemplate reworking non-acoustic cellular core panels, and such panels reworked according to the methods disclosed herein, as well as structures comprising the reworked, non-acoustic panels.

Acoustic paneling includes structures that are specifically designed to absorb, control, or reflect sound away from a particular area. For example, acoustic paneling may be used to reduce the auditory impact of aircraft engines during takeoff, flight, and landing. Acoustic paneling within an aircraft may further reduce and/or redirect aircraft noise during takeoff and landing. Such, noise reduction and redirection may be environmentally mandated via regulations, but is also desirable for passengers within an aircraft.

Presently, acoustic paneling is assembled to conform the paneling to the complex geometries of an aircraft and aircraft structures. Each cell in an acoustic panel comprises a septum, and, over the area of an entire aircraft, there may be thousands of such cells, with each cell in an acoustic panel comprising an installed septum.

While aspects of the present disclosure describe and illustrate panels requiring rework, with the rework shown in segments, according to aspects the present disclosure, the reworking may be conducted with the panel requiring rework remaining intact and as a part of a larger structure. For example, if a larger structure or component, such as an air inlet of an aircraft engine nacelle or other structure such as a thrust reverser requires rework to a panel having a cellular core (that may or may not be an acoustic panel), the rework described herein may be conducted in situ, and therefore without removal of the panel from its structure or component, or of the structure or component from a larger structure to which it is attached.

The methods described herein restore structural strength to reworked panels comprising reworked cellular cores. The disclosed methods further enable rework on large rework areas of large structures, in situ if desired. Further, the presently disclosed methods enable rework, in situ, if desired, including the rework of cellular core panels of any configuration, both planar and non-planar, with the panels comprising an overall regular or irregular geometry.

FIGS. 1A and 2A show a guide 10 for use in conjunction with a cutting instrument to form a cutting apparatus used to cut, or otherwise sever, a section of material according to aspects of the present disclosure. As shown in FIGS. 1A and 2A, the guide 10 comprises a handle 10b, and a base 11 in communication with a plurality of legs 12, and a guide slot 13 extending through and defined by the legs 12 and the base 11. While the illustrations depict the legs having a hexagonal shape, other geometric shapes are contemplated.

FIGS. 1A and 1B show overhead plan views of the guide 10 and 10a shown in FIGS. 1A and 1B respectively, with the view shown downward in the direction of lines 2A and 2B respectively. FIGS. 2A and 2B, respectively, show a guide 10 and 10a for use in conjunction with a cutting instrument to form a cutting apparatus used to cut, or otherwise sever, a section of material according to aspects of the present disclosure. As shown in FIGS. 2A and 2B, the guide 10, 10a comprises a handle 10b, and a base 11 in communication with a leg 12, and a guide slot 13 extending through and defined by the leg 12 and the base 11. Again, while the illustrations depict the leg having a hexagonal shape, other geometric shapes are contemplated.

The depicted, substantially hexagonal, shape of the legs 12 of the guide 10 (or in the case of FIGS. 1B and 2B, the single leg 12 of the guide 10a) are dimensioned to fit into and otherwise engage the cellular walls of a honeycomb cellular structure. For example, if a cellular core material requires rework, aspects of the present disclosure contemplate a guide having at least one leg with a geometric shape (e.g., a polygonal, circular, rectangular, or other shape, etc.) that fits into or otherwise engages (but may or may not substantially match) the cellular wall of a cellular core material having a geometry and dimension to receive the leg of the guide.

According to further aspects, the geometry and dimension of the guide leg substantially matches the geometry and dimension of the cellular walls of the cells in the cellular core panel (e.g. substantially rectangular legs on the guide for use in reworking a cellular core having substantially rectangular cells; substantially circular legs on the guide for use in reworking a cellular core having substantially circular cells; substantially polygonal legs on the guide for use in reworking a cellular core having substantially matching polygonal cells, etc.).

FIGS. 3 and 4 show a cutting apparatus. As shown in FIG. 3, cutting instrument 14 has a blade 15 and a blade edge 16, with the blade 15 having a width "W" substantially equivalent to the width of the guide slot 13, such that blade 15 is accommodated or received by guide slot 13, as shown in FIG. 4. Together, the cutting instrument 14 and the guide 10 comprise a cutting apparatus 17.

FIG. 5 shows a high bypass engine 20 is mounted an aircraft wing 22 by a pylon 24. The engine 20 includes a surrounding engine nacelle 26 having an air inlet 28. The air inlet 28 includes an acoustic area 30 in the form of an acoustic panel 32 for reducing noise caused by high airflow through the air inlet 28 into the engine 20. The acoustic panel 32 includes an area requiring rework, hereinafter referred to as a rework area 35 (shown in FIG. 7 et. seq.). The need for rework to the acoustic panel 32 may be the result of any of a number of causes and conditions.

FIG. 6 illustrates additional details of the acoustic panel 32. The acoustic panel 32 comprises a cellular core 34 (shown, in non-limiting fashion, as a honeycomb core) sandwiched between inner facesheet 36 and outer facesheet 38. The inner facesheet 36 includes a multiplicity of perforations 44 there through which allow soundwaves including noise to pass through the inner facesheet 36 into the cellular core 34. The inner facesheet 36 is attached to a face of the cellular core 34 by an adhesive bond line 40. Similarly, the outer facesheet 38 is attached to the other face of the cellular core 34 by an adhesive bond line 42. As illustrated, the inner and outer facesheets 36 and 38 respectively, each comprise a laminated composite such as a carbon fiber reinforced plastic (CFRP), however either or both of these facesheets can comprise other materials such as, without limitation, a metal such as aluminum, a ceramic material, etc. The cellular core 34 can comprise a metal such as aluminum, a polymer or other material, etc., and is formed of a multiplicity of individual polygonal cells 46 (herein referred to as "cells". In the illustrations, the cells 46 are hexagonal. However other cell geometries are possible and contemplated by aspects of the present disclosure. Each individual cell 46 is shown in FIGS. 6 and 8 comprising a septum 48. The septum 48 further acts as a noise attenuation feature in acoustic panel used in core materials, and the septum 48 may be made from any desired material.

As further shown in FIG. 8, each individual cell 46 in the acoustic panel comprises cell walls 45, with each cell septumized by a septum 48 that is positioned within each cell 46 at a preselected depth "D". The septums 48, comprising septum perforations 47 assist in dampening and attenuating soundwaves entering cellular core 34 through the perforations 44 in the inner facesheet 36.

FIG. 7 shows an area of exposed cellular core 34 in panel 32 requiring rework. The section marked in "bold" represents an area of rework or, rework area 35 requiring removal, and when removed from the cellular core 34 becomes the removable cellular core 51 (FIG. 11). According to one aspect of the present disclosure, as shown in FIG. 7, a section of inner facesheet 36 (as shown in FIG. 6) is removed, exposing a rework area 35 of the cellular core 34 of panel 32.

FIG. 9 shows a perspective view of an acoustic panel 32, prepared for an area of rework 35 of the cellular core 34. The inner facesheet 36 has been prepared by removing a portion of the facesheet that covers the rework area 35, and exposing the cellular core 34.

As shown in FIG. 10, the cutting apparatus 17 is in place with legs 12 inserted into cells 46 of the area of rework 35, with blade 15 positioned within guide slot 13 of cutting apparatus 17 such that blade edge 16 (not visible in FIG. 10) contacts and severs a cell wall 45 at a cell wall juncture 49 (e.g., the point where cell walls converge and meet adjoining cell walls. While the legs 12 of the guide 10 and the cells 46 are shown as hexagonal in shape, it is presently contemplated that the legs and the cells may be of any shape, so long as the legs of the guide are dimensioned to be received into the cells and retain the guide in a substantially fixed orientation through, for example, a friction fit. As a striking implement 18 (e.g., shown in FIG. 109 in non-limiting fashion as a hammer) strikes the blade 15, of the cutting apparatus 17, the blade edge 16 (not visible in FIG. 10) severs the cell wall cleanly from adjoining cell walls at a cell wall juncture 49. This operation is repeated (around a perimeter of a section of cellular core to be reworked and removed) until, as shown in FIG. 11, a removable cellular section 51 is separated or "freed" from the cellular core 34 and can be removed from the cellular core 34 to form a cut-out cellular core 53 that now remains in panel 32 (as shown in FIG. 11).

Further aspects contemplate the use of manual or automated means to apply directed pressure to the guide for the purpose of positioning the guide into the cellular core, and for the purpose of depressing the blade of the cutting apparatus into the cellular core. According to aspects of the present disclosure, the process of severing the cell wall cleanly from adjoining cell walls at a cell wall juncture 49 creates a cut-out cellular core 53 that remains from the cellular core 34, with the cut-out cellular core 53 comprising a plurality of cells wherein each cell comprises an intact septum.

In addition, a further cutting apparatus is contemplated wherein a guide comprises only one leg (as represented in FIGS. 1B and 2B), with the leg having a geometry and dimension to suitably engage or otherwise fit into a cell in a cellular core panel. As with the multi-leg guides described above, the leg of a single leg guide would have a dimension and geometry to substantially match the dimension and geometry of the cell. When a guide comprises only a single leg, it is contemplated that such a guide would comprise a slot extending lengthwise through the leg, or comprise another feature configured to receive a blade and orient the blade edge against a cell wall juncture.

Aspects of the present disclosure that are not illustrated further contemplate a cutting apparatus with a guide or a plurality of guides having an overall substantially circular, hexagonal, or other geometric configuration that could be configured to be placed once or more into the cellular core, with an appropriately configured blade or plurality of blades positioned into the guide or plurality of guides such that pressure applied to the cutting apparatus substantially simultaneously severs the number of cell walls that are required to liberate the cellular core rework area that is to be removed from the cellular core.

As shown in FIGS. 12, 13 and 14, in order to replace the removable core section 51 that is removed from the cellular core 34, a cellular rework section plug 54, or "plug" (as shown in FIG. 17) is fabricated from a cellular panel stock material 55 or "cellular panel blank".

According to an aspect, the cellular panel stock material 55 is formed from a material substantially the same or different from the material that is used to make the cellular core 34, and further has substantially the same cell size/geometry and overall area as the void left in the cut-out cellular core 53. The cellular rework section plug 54 may be expanded or contracted, as desired, so that the dimension of the cells 46 of the cellular rework section plug 54 are substantially identical to the cells 46 of the removable cellular core 51 that is removed from the cellular panel 34. Further, the dimension of the cellular rework section plug 54 made from the cellular panel stock material 55 is therefore substantially the same dimension as that of the space left in the cut-out cellular core 53.

According to aspects of the present disclosure, the cutting of the cellular panel stock material 55 to form the cellular rework section plug 54 (that is removed from the cellular panel stock material 55) is conducted (as shown in FIG. 17) so as to maintain an intact, or full cell and an intact septum in each cell in the cellular rework section plug 54.

According to further aspects of the present disclosure, the outer peripheral cells of the cellular rework section plug 54 form flat repair plug cell wall edges. In this way, the cellular rework section plug 54 is dimensioned to fit into the cut-out cellular core section 53 with precision as the cell wall exterior of the cellular rework section plug 54 will abut and otherwise adjoin the exposed cell walls of the cut-out cellular core section 53.

As shown in FIGS. 12, 13 and 14, the cell wall cutting operation similar to that shown in FIG. 10 and described above (for cutting the cellular panel 34 being reworked) is also conducted on the cellular panel stock material 55, with the legs 12 of guide 10 positioned into cells 46 (as shown in FIG. 12), and with the guide 10 depressed into position within cells 46 (as shown in FIG. 13), followed by inserting the blade 15 into the guide slot of the guide 10 with pressure applied to the blade 15 of the cutting apparatus 17 via a striking implement 18 (e.g., a hammer) as shown in FIG. 14.

As shown in FIGS. 12, 13, and 14, the guide 10 is positioned into cells 46 in the cellular panel stock material 55 (from which the cellular rework section plug 54 is cut). As shown in FIGS. 13, 14, and 15, the guide slot 13 is positioned in cells 46, such that, when the blade edge 16 of the blade 15 is inserted into guide slot 13 (shown in detail in FIG. 16), the cells 46 will be severed at and from adjoining cells at the cell wall juncture 49 (e.g., the point where adjoining cell walls converge). FIGS. 15 and 16 are, therefore, close-up views of cells 46 into which first the guide 10 is located (shown in FIG. 15), followed by introducing the blade 15 into the guide slot 13 in the guide 10 (as shown in FIG. 16).

According to aspects of the present disclosure, the cellular rework section plug 54 will be severed from the cellular panel stock material (e.g., shown as a honeycomb "blank" of stock material) "cleanly". That is, the guide for the cutting instrument, according to aspects of the present disclosure, will position a blade within the guide slot to sever cell walls at the point of cell wall convergence (e.g., at the cell wall juncture 49), leaving substantially no extraneous cell wall material on the cellular rework section plug 54 or the substantially similarly dimensioned cut-out cellular core section 53. Additionally, the precision cutting effected by aspects of the present disclosure for, for example, cellular core acoustic panels, the septums present in the cells of the cellular rework section plug 54 and the cells of the substantially similarly dimensioned cut-out cellular core section 53 are left acoustically intact in the cells after cutting.

FIG. 17 shows a cellular rework section plug 54 that has been cut and removed from a cellular panel stock material 55 according to aspects of the present disclosure. As shown in FIG. 17, the cell wall 45 has been cleanly severed at the cell wall juncture 49.

As shown in FIG. 18, adhesive 56 is applied to the exposed surfaces of the cut-out cellular core 53.

Alternatively, or in addition to, applying adhesive to the cut-out cellular core 53, as shown in FIG. 19, adhesive 56 is applied to the outer surface of the cell walls 46 of the cellular rework section plug 54. Although FIGS. 18 and 19 together depict applying adhesive to both the cellular rework section plug 54 and the cut-out cellular core section 53, it is understood that the adhesive 56 applied to only one of the cellular rework section plug 54 or the cut-out cellular core section 53 may suffice to adequately perform the required rework of the acoustic panel. The adhesive may be applied in film, paste, or other form, as desired.

As shown in FIG. 20, the cellular rework section plug 54 is fitted into the space left in the cut-out cellular core section 53, and fitted into place as shown in FIG. 21 such that the cell walls of the existing cut-out cellular core section 53 and the cellular rework section plug 54 are positioned adjacent to one another. Therefore, aspects of the present disclosure contemplate that the rework section plug 54 is dimensioned to very closely approximate, or even be identical to the dimension of the space left in the cut-out cellular core section 53.

Further aspects of the present disclosure appreciate that practical manufacturing tolerances can realize very slight dimensional variances between the rework section plug 54 and the space being filled by the plug 54 in the cut-out cellular core section 53. Such variances between the rework section plug 54 and the space being filled by the plug 54 in the cut-out cellular core section 53 may range from about 1 mil to about 2 mils. For example, in such instances where the dimension between the rework section plug 54 and the space left in the cut-out cellular core section 53 vary slightly (e.g. a variance ranging from about 1 mil to about 2 mils), the replacement plug would be slightly compressed in the transverse and cell wall direction in order to insert the rework section plug 54 into place in the cut-out cellular core section 53.

According to further aspects, without being bound to any particular theory, it is believed that the adhesive 56 that is selected for use and applied to both, or either of the cellular rework section plug 54 and the cut-out cellular core section 53 would act as a lubricant to facilitate the insertion of the rework section plug 54 into place in the cut-out cellular core section 53. Again, without being bound to any particular theory, it is believed that the adhesive 56 that is selected for use and applied to both, or either of the cellular rework section plug 54 and the cut-out cellular core section 53, would also act as gap filler as needed.

As shown in FIG. 20, the cellular rework section plug 54 is inserted downwardly into the cut-out cellular core 53 section, to a desired depth, for example, until the bottom of the cellular rework section plug 54 engages the outer facesheet 38, and such that the top surface of the cellular rework section plug 54 is substantially "flush" with the top surface of the cut-out cellular core 53, as shown in FIG. 21.

FIG. 21 further shows a bond line 57 now established in the reworked cellular panel 34, with the bond line 57 effectively outlining the perimeter of the cellular rework section plug 54. Positioning the cellular rework section plug 54 into its final or near final position can be accomplished with any method that does not adversely impact the structural integrity of the cellular rework section plug 54 or the cut-out cellular core 53. Such methods include, without limitation, vacuum or other pressure-assisted manual or automatic mechanical means, including, but not limited to, processes such as "vacuum bagging", etc. As shown in FIG. 21, the cellular rework section plug 54 is fully inserted into a final position in the cut-out-cellular core section 53, to complete the rework of the "original" cellular core 34, now referred to in FIGS. 21, 22, 23 and 24 as the reworked cellular core 58.

According to an aspect of the present disclosure not shown, film, paste, or other adhesive can be applied to the bottom of the rework section plug 54 and/or to the area of the outer facesheet 38 that is beneath the cut-out cellular core 53 (e.g., the inner surface of the outer facesheet), so that the rework section plug 54 is bonded to the outer facesheet 38. The rework area is then subjected to elevated temperature in order to cure the thermal adhesive and thereby bond the rework section plug 54 to the cut-out cellular core section 53. Other cure techniques are also contemplated including, but not limited to, curing techniques involving elevated temperature and/or pressures, as well as ambient cure techniques.

FIG. 22 is a cross-sectional side view of the reworked acoustic panel 60 with the cellular core 34 having now been reworked into the reworked cellular core 58. Techniques can be used to repair the inner facesheet 36 that will cover the reworked cellular core 58. For example, the area 64 of the inner facesheet 36 surrounding the rework area 35 may be scarfed at scarf 64, and rework patch 68 may be fabricated having a taper 62 that substantially matches the scarf 64. A layer of adhesive 66 can be applied to the rework area 35. Another layer of adhesive 69 can be used to adhesively bond the rework patch 68 to the inner facesheet 36, followed by, for example, vacuum bagging techniques to press the rework patch 68 against the inner facesheet 36. While FIG. 22 shows a scarfing lap-joint, aspects of the present disclosure further contemplate that, if desired, other joints (not shown) can be accomplished other than a scarfing lap joint, including, for example and without limitation, a set-lap joint, etc. Further, according to aspects of the present disclosure, the rework patch 68 may be equivalently referred to herein as a "covering layer". In further aspects, a separate covering layer may cover the rework patch, so that both a rework patch and a covering layer are present.

Aspects of the present disclosure as shown in the FIGS. contemplate reworking acoustic panels by entering the panel through the inner facesheet 36. However, so long as the legs of the guide can be inserted into the cells of the cellular core to a distance adequate to effect the required severing of the cell walls, further aspects contemplate reworking the acoustic panel by accessing the cellular core via the outer facesheet 38 side of the acoustic panel. Again, the location of the septums 48 in each cell may dictate which side of the acoustic panel to access for reworking. However, it is theoretically possible to perform the rework from either side of the acoustic panel.

According to aspects of the present disclosure, the curing of the layers of adhesive 66, 69 can occur concurrently with, or subsequent to, the vacuum bagging or other techniques used to effect the replacement section of the inner facesheet covering the rework area of 35 conducted on the cellular core 34

For acoustic panels being reworked, the adhesive 66, 69 as well as the rework patch 68 are selected such that material from the adhesive 66, 69 and the rework patch 68 will not descend or "weep" into the cells 46 they are covering. With respect to the rework patch 68 for acoustic panels, a prepreg system (e.g., BMS-8256, etc.) can be selected that can be cured separately or co-cured with the adhesives 56, 66, 69 used to rework the panel.

FIG. 23 shows a perspective view of the reworked acoustic panel 60 shown in FIG. 22. If desired, curing can be conducted in one step to cure the adhesive 56 applied to the cut-out cellular core section 53 and the cellular rework section plug 54 as well as the layers of adhesive 66 and 69, and the rework patch 68, if the material used to make the rework patch 68 requires curing (e.g., if the rework patch comprises a prepreg or other composite material).

As shown in FIG. 24, after curing, if restoration of structural and acoustic properties, for example, in an acoustic panel, is desired, acoustic perforations are restored to the reworked inner facesheet 71 covering the rework area 35 of the reworked acoustic panel 60. As shown in FIG. 24 such perforations 44 are physically installed in the reworked inner facesheet 71 of the reworked acoustic panel 60, for example, by drilling with drill 70.

Aspects of the present disclosure contemplate restoring perforations to the inner facesheet manually or in an automated fashion. Further aspects contemplate that an automated machine, for example, controlled manually or by a computer-controlled machine, etc., can perform desired perforation operations such as, for example, by punching or drilling the perforations into the replacement area of the facesheet to form the desired perforation pattern.

Though not shown in FIG. 24, aspects of the present disclosure contemplate the use of a template or other type of guide to assist in restoring a desired perforation pattern into the reworked inner facesheet, in conjunction with the perforation drilling operation, and for example, to insure the proper location and orientation of the perforations relative to each cell (e.g., centered perforations relative to each cell, etc.).

FIG. 25 is a flowchart outlining aspects of the present disclosure directed to a method 100 for cutting cellular (e.g., honeycomb core) sections from a cellular panel, with the panel comprising an intact septum in each cell, by inserting 102 a guide into the cellular core, inserting 104 a cutting element into the guide, and severing 106 a cellular core cellular cell wall from adjoining cellular core cell walls at cell wall junctures to form a removable cellular section and a cut-out cellular core section, with the cut-out cellular core section comprising an intact septum in each cell after the cutting operation. The methods outlined in FIG. 25 are contemplated to be used in the cutting step 302 shown in the methods outlined in FIG. 27.

FIG. 26 is a flowchart outlining further aspects of the present disclosure directed to a method 200 for cutting cellular (e.g., honeycomb core) rework section plugs from cellular panel stock material, otherwise referred equivalently to herein as cellular panel stock or cellular panel "blank", with the cellular panel stock comprising an intact septum in each cell, by inserting 202 a guide into the cellular rework stock, inserting 204 a cutting element into the guide, and severing 206 cellular rework stock cell walls from adjoining cellular rework stock cells at cell wall junctures to form a cellular rework section plug. The cellular rework section plug is sized to a dimension that is substantially similar to the space left in the removable cut-out cellular core section. The methods outlined in FIG. 26 are contemplated to be used in the cutting step 402 shown in the methods outlined in FIG. 28.

FIGS. 27A and 27B are flowcharts outlining methods 250 and 300, respectively, for reworking an acoustic panel, according to aspects of the present disclosure. By precisely cutting, or severing cell walls 45 of a cellular core at a cell wall juncture, for example, by using the presently disclosed guides and apparatuses of the present disclosure, a predetermined area 35 of cellular core material requiring rework may be removed from the cellular core 34 such that, when the cellular area requiring rework 35 is precisely severed in a predetermined manner from the cellular core 34, and removed from the cellular core, the cut-out cellular core section 53 that remains comprises intact cells 46 (and therefore intact cell walls 45, with the intact cells 46 retaining an intact septum 48 in each cell.

Similarly, by precisely cutting, or severing cell walls 45 of a cellular core stock material at a cell wall juncture, for example, by using the presently disclosed guides and apparatuses of the present disclosure, a cellular rework section plug 54 can be cut from cellular core stock material. The cellular rework section plug comprises intact cells 46 (and therefore intact cell walls 45), with the intact cells 46 retaining an intact septum 48 in each cell.

FIG. 27A, describes an aspect directed to a method 250 wherein a removable cellular core section 51 is removed 304 from the cellular core 34 to form an area of exposed cellular core in the cut-out cellular core section 53 that remains. The removable cellular core section 51 is discarded. A cellular rework section plug 54 is inserted 306 into the exposed area of the cut-out cellular core 53. According to this method 250 and method 300 as outlined in FIG. 27B, (and method 400 as outlined in FIG. 28) a predetermined area of cellular core material requiring rework 35 is removed from the cellular core 34 such that, when the cellular area requiring rework 35 is severed from the cellular core 34, and removed from the cellular core 34 as removable cellular core section 51, the cut-out cellular core section 53 that remains, comprises intact cells 46 (and therefore intact cell walls 45), with the intact cells 46 retaining an intact septum 48 in each cell 46. Similarly, by precisely cutting, or severing cell walls 45 of a cellular core stock material 55 at a cell wall juncture 49, for example, by using the presently disclosed guides and apparatuses of the present disclosure, a cellular rework section plug 54 can be cut from cellular core stock material 55. The cellular rework section plug 54 comprises intact cells 46 (and therefore intact cell walls 45), with the intact cells 46 retaining an intact septum 48 in each cell. As shown in FIG. 27A, the cellular rework section plug 54 is inserted 306 into the cellular core section. The insertion may be accomplished manually or with the aid of a mechanical device that may or may not be automated.

FIG. 27B describes another aspect directed to a method 300 that accomplishes the steps of the method 250 outlined shown in FIG. 27A with additional steps provided. As shown in FIG. 27B, one or more covering layers of the acoustic panel are first removed in a step of removing 301 a covering layer from the acoustic panel to expose the cellular core 34, followed by, for example, using the presently disclosed guides and apparatuses of the present disclosure for cutting 302 the cellular core 34 to form a removable cellular section 51. The removable cellular section 51 that has been severed from the cellular core 34 is removed 304 to form a cellular cut-out section 53 that remains. Adhesive is applied 305 to at least one of the exposed cells 46 of the cut-out cellular core section 53 and/or the exposed cells 46 of the cellular rework section plug 54 exterior. The application of the adhesive may be done manually or mechanically and in an automated fashion, if desired. Any suitable adhesive is contemplated according to aspects of the present disclosure, including, without limitation, curable resin-based adhesives such as, for example epoxy resin-based adhesives. The cellular rework section plug (54) is inserted 306 manually or with the aid of a mechanical device that may or may not be automated into the exposed area of the cut-out cellular core (53) and the cellular rework section plug (54) is adhered 308 to the cut-out cellular core section (53) to form a reworked cellular core. FIG. 27B further shows the steps of adhering 309 at least one covering layer over the reworked cellular core followed by curing 310 the covering layer. As contemplated by aspects of the present disclosure, the covering layer used replicates the characteristics of the original covering layer that is partially removed to expose the cellular core, and includes, without limitation composite materials, metals, etc. If desired, the replacement covering layer may differ in material and/or characteristics from the original covering layer that is partially removed to expose the cellular core. Curing of the adhesives used may be required and is therefore also contemplated. The curing may follow heat- and/or pressure based regimens, although other curing methods are contemplated herein for use with adhesive systems that can be cured in other ways including, without limitation, ultraviolet (UV) curing, ultrasonic curing, etc. According to further aspects, co-curing of adhesive layers and additional covering layers can be accomplished during the curing 310 step, if desired.

FIG. 28 is a flowchart describing another aspect directed to a method 400 for reworking an acoustic panel comprising, for example, using the presently disclosed guides and apparatuses of the present disclosure, cutting 402 an area of cellular core material from an acoustic panel to form a cut-out cellular core section and removing 404 a removable cellular core section 51 to form the cut-out cellular core section 53. Optionally, if required, before the step of cutting 302, one or more covering layers are first removed in a step of removing 401 a covering layer from an acoustic panel to expose the cellular core. A cellular rework section plug 54 is formed 406 by removing the cellular rework section plug from a cellular panel stock according to aspects of the present disclosure, for example, by using the presently disclosed guides and apparatuses of the present disclosure, with the cellular rework section plug sized to a dimension substantially similar to the removed cellular core and the cut-out cellular core section. Adhesive is applied 407 to at least one of the exposed cellular core and the rework section plug exterior. The cellular rework section plug is inserted 408 into the cut-out cellular core section and the cellular rework section plug is adhered 410 to the cut-out cellular core section to form a reworked cellular core.

Aspects of the present disclosure find use in a variety of potential applications, particularly in the transportation industry including, for example, aerospace, marine, automotive applications and other application where acoustic panels can be employed and are desired. Thus, referring now to FIGS. 29 and 30, aspects of the disclosure may be used in the context of an aircraft manufacturing and service method 500 and aircraft 600 including at least in the component and subassembly manufacturing 506, system integration 508, maintenance and service 514, in the assembly and maintenance of the aircraft airframe 602, and through aircraft interior 604.

Aircraft applications of the disclosed aspects may include, for example, and without limitation, repair of acoustic areas around engines, such as engine nacelles and thrust reversers. During pre-production, exemplary method 500 includes specification and design 502 of the aircraft 600 and material procurement 504. During production, component and subassembly manufacturing 506 and system integration 508 of the aircraft 600 takes place. Thereafter, the aircraft 600 may go through certification and delivery 510 in order to be placed in service 512. While in service by a customer, the aircraft 600 is scheduled for routine maintenance and service 514, which may also include modification, reconfiguration, refurbishment, and so on.

Each of the processes of method 500 can be performed or carried out by a system integrator, a third party, and/or an operator (e.g., a customer). For the purposes of this description, a system integrator may include, without limitation, any number of aircraft manufacturers and major-system subcontractors. Further, a third party may include, without limitation, any number of vendors, subcontractors, and suppliers; and an operator may be an airline, leasing company, military entity, service organization, and so on.

As shown in FIG. 30, the aircraft 600 produced by exemplary method 500 can include an airframe 602 with a plurality of systems 603 and an interior 604. Examples of high-level systems 603 include, without limitation, one or more of a propulsion system 604, an electrical system 608, a hydraulic system 610, and an environmental system 612. Any number of other systems can be included. Although an aerospace example is shown, aspects of the present disclosure may be applied to other industries, such as the marine and automotive industries.

Systems and methods embodied herein may be employed during any one or more of the stages of the production and service method 500. For example, components or subassemblies corresponding to production process 506 may be fabricated or manufactured in a manner similar to components or subassemblies produced while the aircraft 600 is in service. Also, one or more apparatuses, methods, or a combination thereof may be used during the production stages 506 and 508, for example, by substantially expediting assembly of or reducing the cost of an aircraft 600. Similarly, one or more of apparatus embodiments, method embodiments, or a combination thereof may be utilized while the aircraft 600 is in service, for example and without limitation, to maintenance and service 514 the aircraft 600.

For cellular core rework that need not involve acoustic characteristics, the rework methods according to aspects of the present disclosure also afford advantages over known methods of cellular core panel rework, especially where the reestablishment of a desired degree of substantially uniform structural integrity is desired. For example, presently disclosed methods obviate the need for foam adhesives or film adhesives that, for example, may otherwise contribute to unwanted depressions or deformations in replacement repair skins. In addition, when a rework of a non-acoustic panel is required, aspects of the present disclosure can employ a wet layup replacement skin ply or plies over cellular core rework area, as opposed to prepreg application that can be used as coverings for inner facesheets of acoustic panels. In such circumstances of non-acoustic panel rework, aspects of the present disclosure further contemplate rework methods not requiring reestablishment of perforations into inner facesheets, for example.

The present disclosure therefore further contemplates reworking panels, portions of panels and aircraft and portions of aircraft made using the cutting instruments and apparatuses disclosed herein. The present disclosure further contemplates the use of the disclosed methods to make the disclosed reworked panels or reworked portions of panels in the manufacture of objects, including stationary structures including, without limitation buildings, supports, etc. The disclosed reworked panels and reworked portions of panels and methods of their manufacture as well as the use of the disclosed cutting instrument and disclosed apparatuses are further contemplated for use in the manufacture of reworked panels and reworked portions of vehicles, such vehicles including manned and unmanned aircraft, manned and unmanned spacecraft, manned and unmanned rotorcraft, manned and unmanned terrestrial vehicles, manned and unmanned surface water borne vehicles, manned and unmanned sub-surface water borne vehicles, and satellites, etc.

Aspects of the present disclosure can, of course, be carried out in other ways than those specifically set forth herein without departing from essential characteristics of aspects disclosed herein. The presently disclosed aspects are to be considered in all respects as illustrative and not restrictive, and all changes coming within the meaning and equivalency range of the appended claims are intended to be embraced therein.

What is claimed is:

1. A guide for a cutting instrument, the guide comprising:
   a base;
   at least one leg in communication with the base, said at least one leg dimensioned to mate with a cellular core cell, said cellular core cell comprising a cellular core geometry and said at least one leg comprising the cellular core geometry,
   a guide slot configured to extend longitudinally through the base, said guide slot defined by the at least one leg and the base, said guide slot positioned proximate to a cell wall juncture of adjoining cellular core cells, said guide slot configured to receive a cutting instrument having a leading blade edge; and
   wherein when the cutting instrument is received by the guide slot, the cutting instrument is configured to sever at least one cell wall of the cellular core cell completely from an adjoining cell wall at the cell wall juncture to form at least one of: a cellular section rework plug or a cut-out cellular core section.

2. The guide of claim 1, wherein
   the at least one leg is dimensioned to extend into the cellular core cell, said cellular core cell comprising a plurality of cell walls; and
   wherein said guide slot is defined by the at least one leg and the base.

3. The guide of claim 1, wherein the cutting instrument comprises a leading blade edge.

4. The guide of claim 3, wherein the guide is configured to direct the cutting instrument proximate to the cell wall juncture.

5. The guide of claim 4, wherein said cell wall juncture comprises a plurality of cell walls of adjacent cellular core cells.

6. The guide of claim 1, wherein the guide further comprises a handle, said handle extending from the base, said handle configured to allow a user to selectively insert said guide at least partially into the cellular core cell.

7. The guide of claim 1, wherein the at least one leg is dimensioned to mate with the cellular core cell when the at least one leg is inserted into the cellular core cell.

8. The guide of claim 1, wherein said guide slot is further configured to guide the leading blade edge to engage at least one cell wall.

9. The guide of claim 4, wherein said guide slot is further configured to guide the leading blade edge to engage the cell wall adjoining the pair of cellular core cells.

10. The guide of claim 1, further comprising a pair of legs in communication with the base, wherein each of the pair of legs is dimensioned, respectively, to extend into each of an adjacent pair of cellular core cells, wherein the guide slot is defined by the pair of legs and the base to extend longitudinally within the guide and substantially between the pair of legs.

11. The guide of claim 1, wherein the cellular core geometry comprises a hexagonally configured cellular core cell.

12. An apparatus for reworking a panel, said apparatus comprising:
    a cutting instrument; and
    a guide, said guide comprising:
      a base;
      at least one leg in communication with the base, said at least one leg dimensioned to mate with a cellular core cell in a panel, said cellular core cell comprising a plurality of cell walls, said cellular core cell further comprising a cellular core geometry, said cell walls comprising a cell wall juncture, and said at least one leg comprising the cellular core geometry,
      a guide slot extending longitudinally through the base, said guide slot defined by the leg and the base, said guide slot positioned proximate to the cell wall juncture of adjoining cellular core cells, and said guide slot being configured to selectively receive said cutting instrument; and
    wherein when the cutting instrument is positioned in the guide slot, the cutting instrument is configured to sever at least one cell wall of the cellular core cell completely from an adjoining cell wall at the cell wall juncture to form at least one of: a cellular section rework plug or a cut-out cellular core section.

13. The apparatus of claim 12, wherein the cellular core geometry comprises a hexagonally configured cellular core cell.

14. The apparatus of claim 12, wherein said guide slot is dimensioned to receive the cutting instrument, said cutting instrument comprising a leading blade edge.

15. The apparatus of claim 12, wherein the guide further comprises a handle extending from the base, said handle configured to allow a user to selectively insert said leg into the cellular core cell.

16. The apparatus of claim 12, wherein the cutting instrument comprises a blade, said blade further configured to move within a length of the guide slot, said blade comprising a leading cutting edge.

17. The apparatus of claim 16, wherein said guide slot is further configured to guide the leading blade edge to engage the cell wall.

18. The apparatus of claim 12, wherein the base includes a handle extending longitudinally from the base, wherein the handle is configured to allow a user to selectively mate said at least one leg with said cellular core cell.

19. The apparatus of claim 12, wherein the guide is configured to direct the cutting instrument proximate to the cell wall juncture.

20. The apparatus of claim 12, wherein said cell wall juncture comprises a plurality of cell walls of adjacent cellular core cells.

* * * * *